(12) United States Patent
Yang

(10) Patent No.: US 8,874,032 B2
(45) Date of Patent: Oct. 28, 2014

(54) MOBILE TERMINAL AND CONTROL METHOD THEREOF

(71) Applicant: LG Electronics Inc., Seoul (KR)

(72) Inventor: Jongchul Yang, Bucheon (KR)

(73) Assignee: LG Electronics Inc., Seoul (KR)

( * ) Notice: Subject to any disclaimer, the term of this patent is extended or adjusted under 35 U.S.C. 154(b) by 143 days.

(21) Appl. No.: 13/730,604

(22) Filed: Dec. 28, 2012

(65) Prior Publication Data

US 2014/0011448 A1    Jan. 9, 2014

(30) Foreign Application Priority Data

Jul. 6, 2012  (KR) .................. 10-2012-0074067

(51) Int. Cl.
*H04B 5/00* (2006.01)
*H04M 1/725* (2006.01)
*G06Q 20/32* (2012.01)
*H04N 21/81* (2011.01)

(52) U.S. Cl.
CPC .............. *H04B 5/00* (2013.01); *G06Q 20/3278* (2013.01); *H04M 1/7253* (2013.01); *H04M 2250/04* (2013.01); *H04N 21/81* (2013.01)
USPC ...................... 455/41.1; 455/550.1; 455/566

(58) Field of Classification Search
CPC .............. H04B 1/10; H04B 1/16; H04B 1/18; H04B 1/1661; H04B 17/00; H04B 5/00; H04M 1/7253; H04M 2250/04; H04N 21/81
USPC .............. 455/41.1, 41.2, 67.11, 456.1, 550.1, 455/566, 567, 575.1
See application file for complete search history.

(56) References Cited

U.S. PATENT DOCUMENTS

| | | |
|---|---|---|
| 2007/0279241 A1 | 12/2007 | Jung et al. |
| 2009/0036056 A1 | 2/2009 | Oshima et al. |
| 2012/0208466 A1* | 8/2012 | Park et al. .................. 455/41.3 |
| 2013/0231135 A1* | 9/2013 | Garskof .................. 455/456.1 |
| 2013/0244575 A1* | 9/2013 | Forutanpour et al. ........ 455/41.1 |
| 2014/0080416 A1* | 3/2014 | Seo et al. .................. 455/41.2 |

OTHER PUBLICATIONS

NFC Forum, "Smart Posters", XP055080826, Apr. 2011, 25 pages.
European Patent Office Application Serial No. 12193682.7, Search Report dated Oct. 7, 2013, 8 pages.

* cited by examiner

*Primary Examiner* — Thanh Le
(74) *Attorney, Agent, or Firm* — Lee, Hong, Degerman, Kang & Waimey

(57) ABSTRACT

A mobile terminal includes a communication unit for performing near field communication (NFC) with a detected object and receiving data from the object; a display; and a controller monitoring time duration for which the terminal remains within a first threshold distance relative to the object; identify each of a plurality of time thresholds respectively occurring during the time duration; and cause the display to sequentially display a plurality of different data responsive to an occurrence of a corresponding time threshold of the plurality of time thresholds. Each of the plurality of different data corresponds to one of the plurality of time thresholds and the plurality of different data is based on the data received from the object.

22 Claims, 18 Drawing Sheets

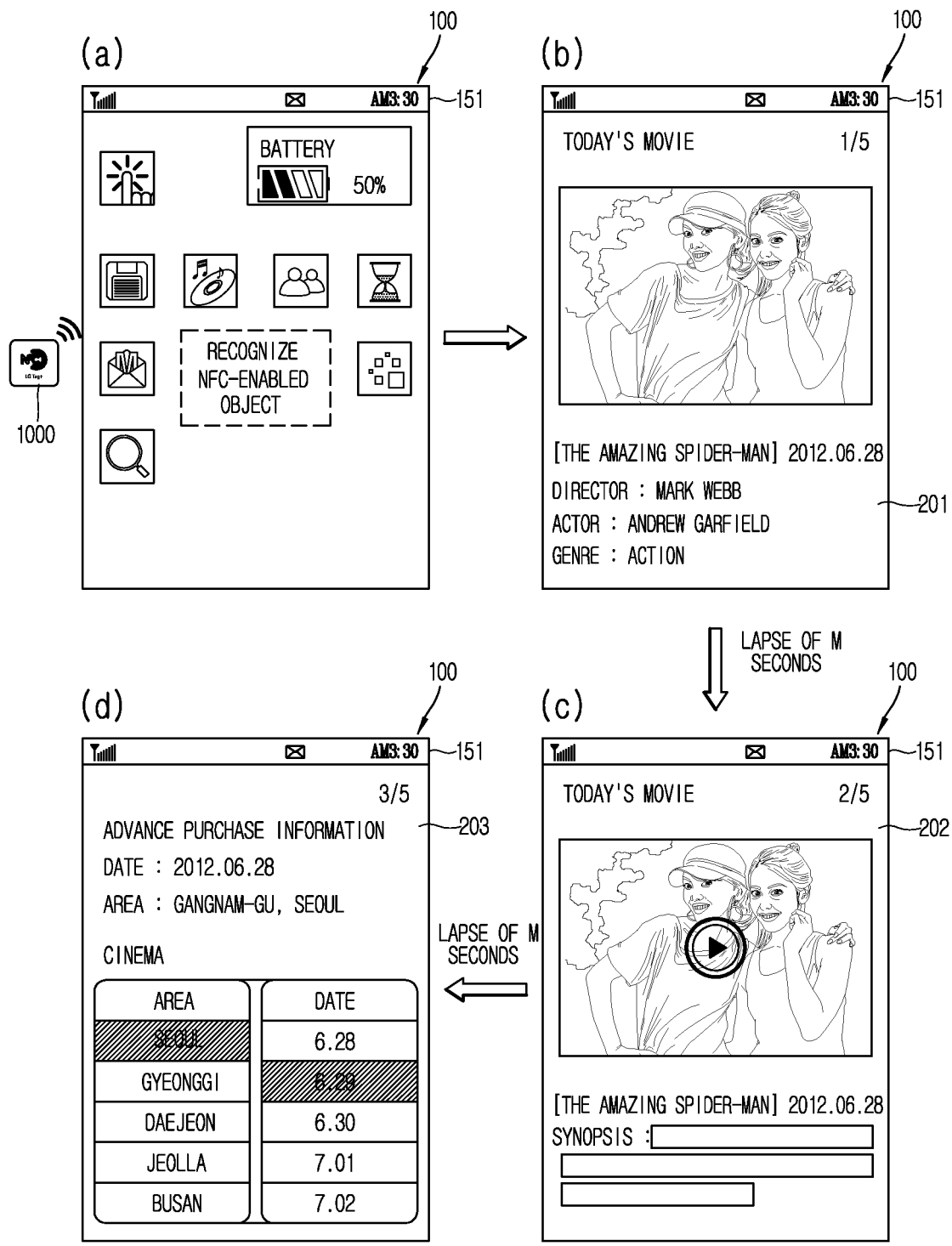

FIG. 4B
(a)
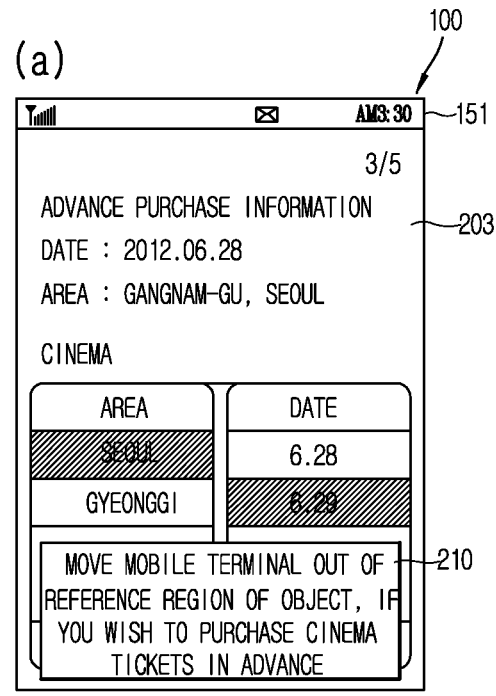
(b)
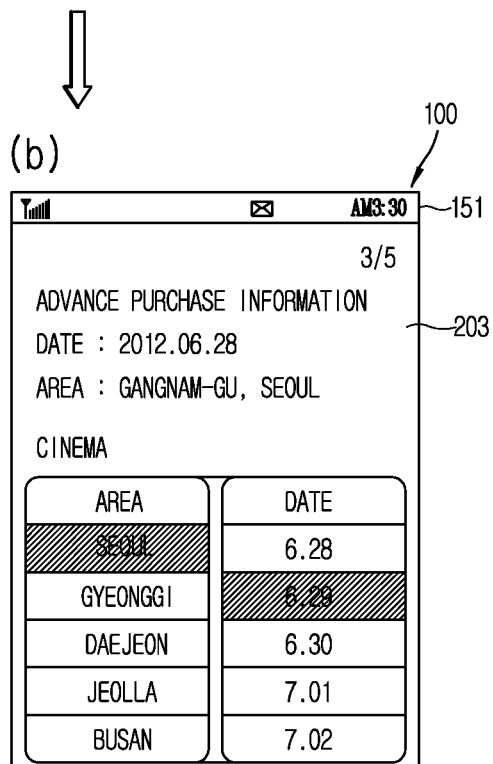
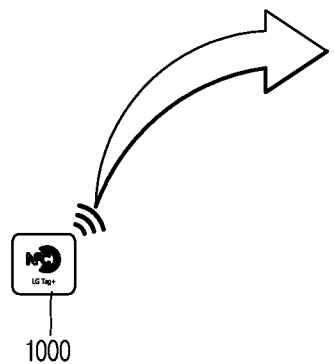

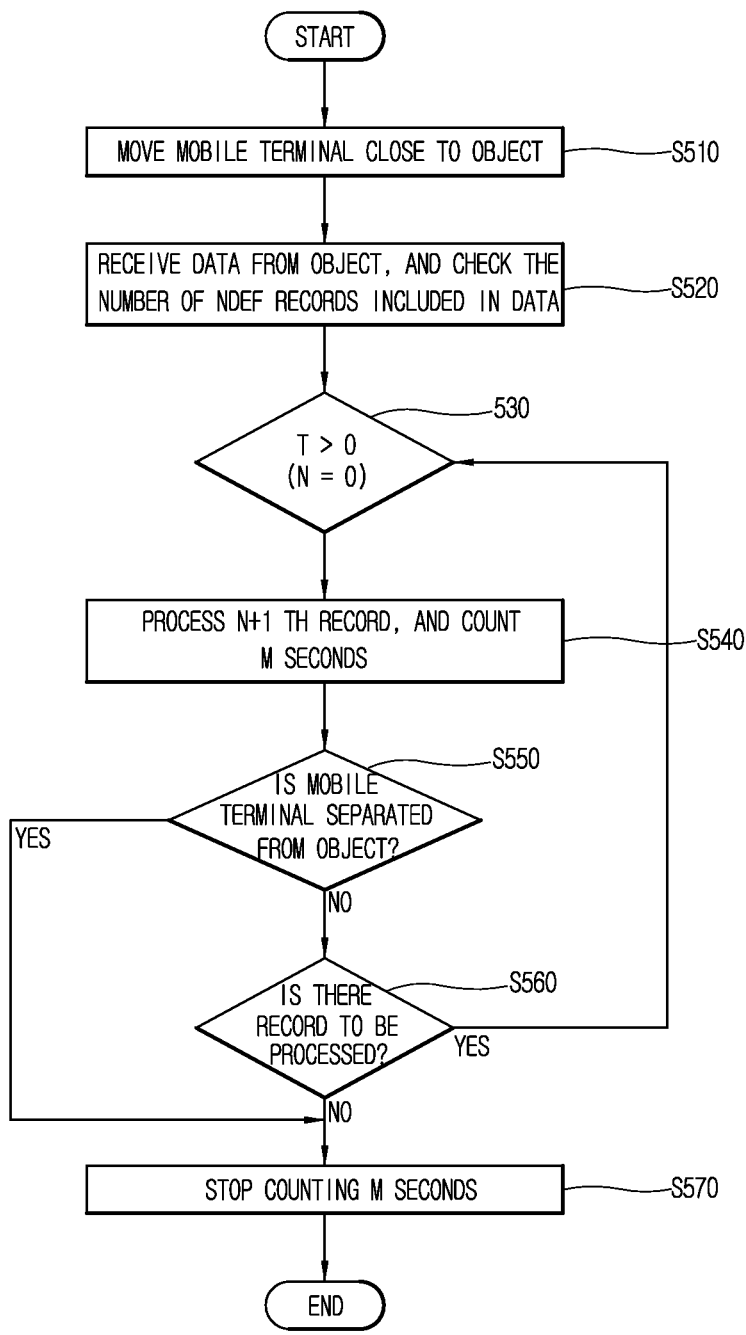

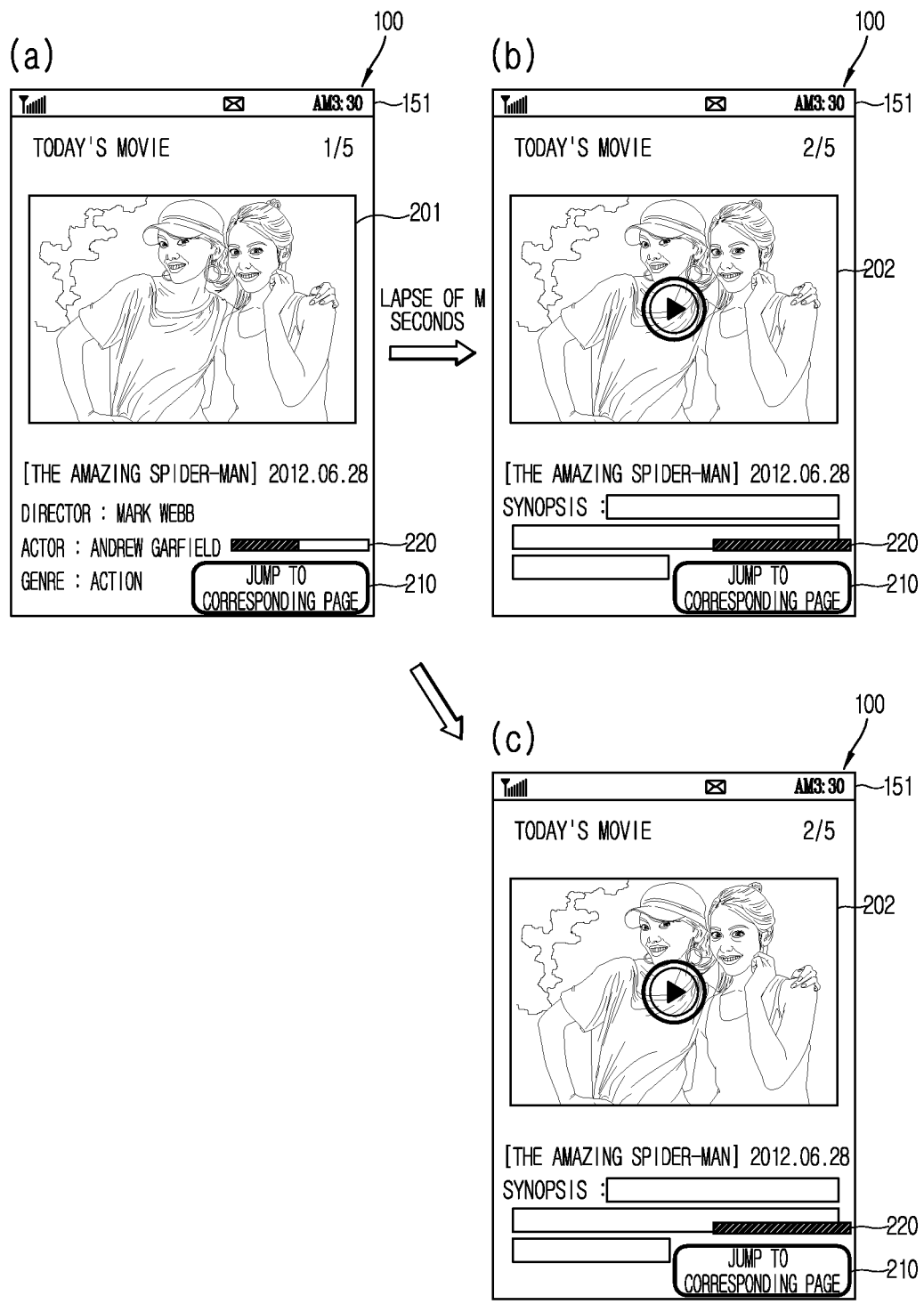

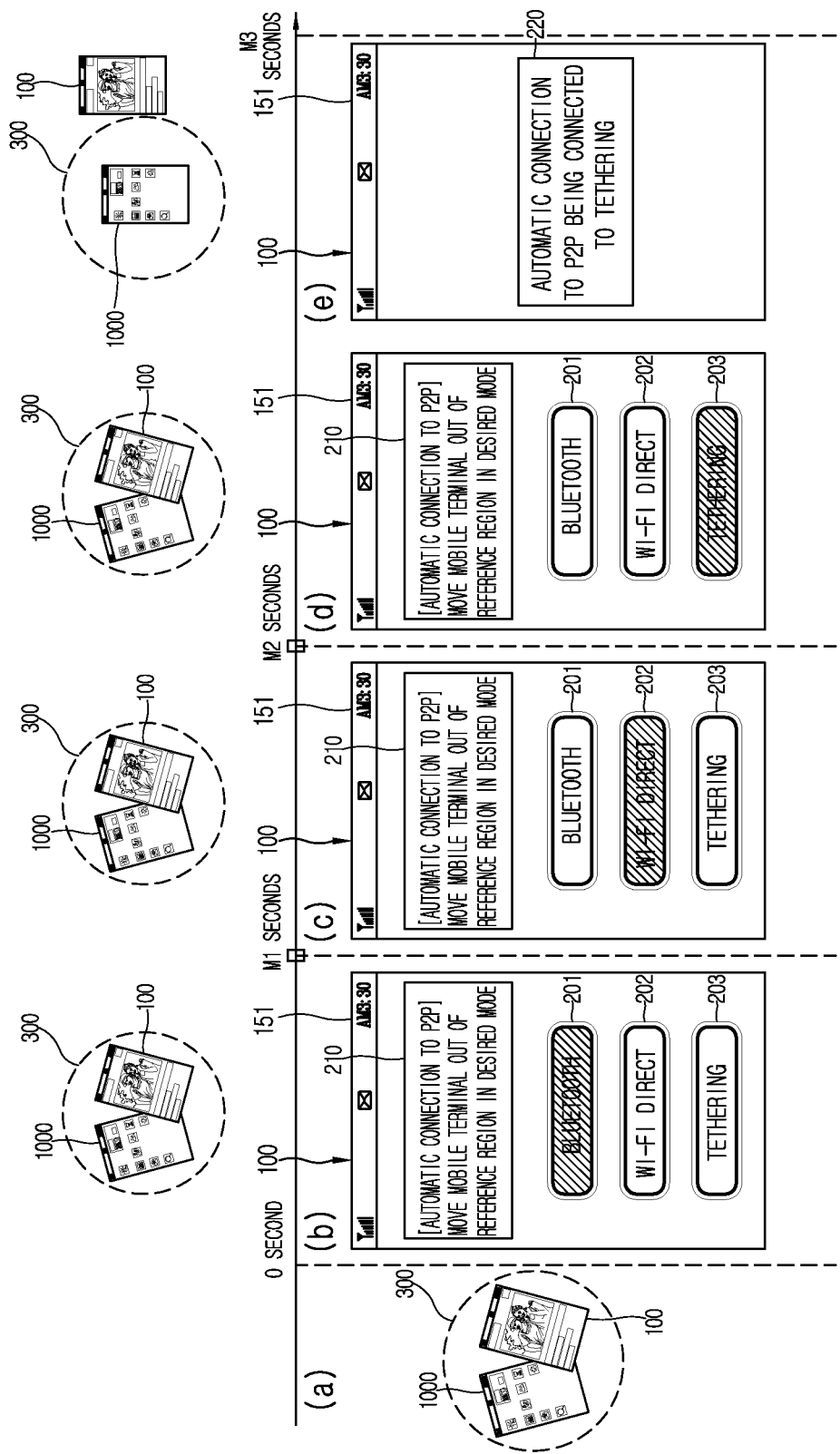

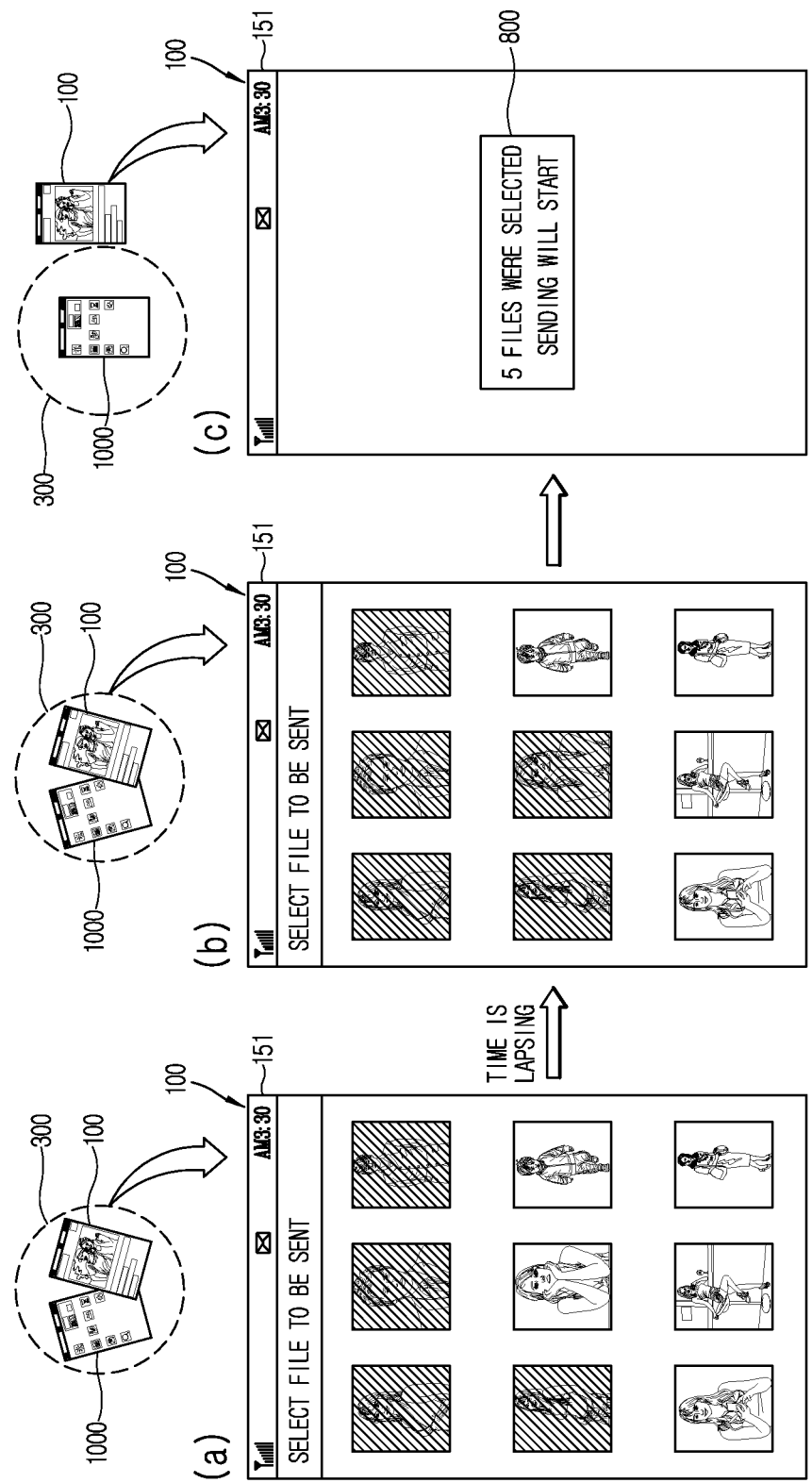

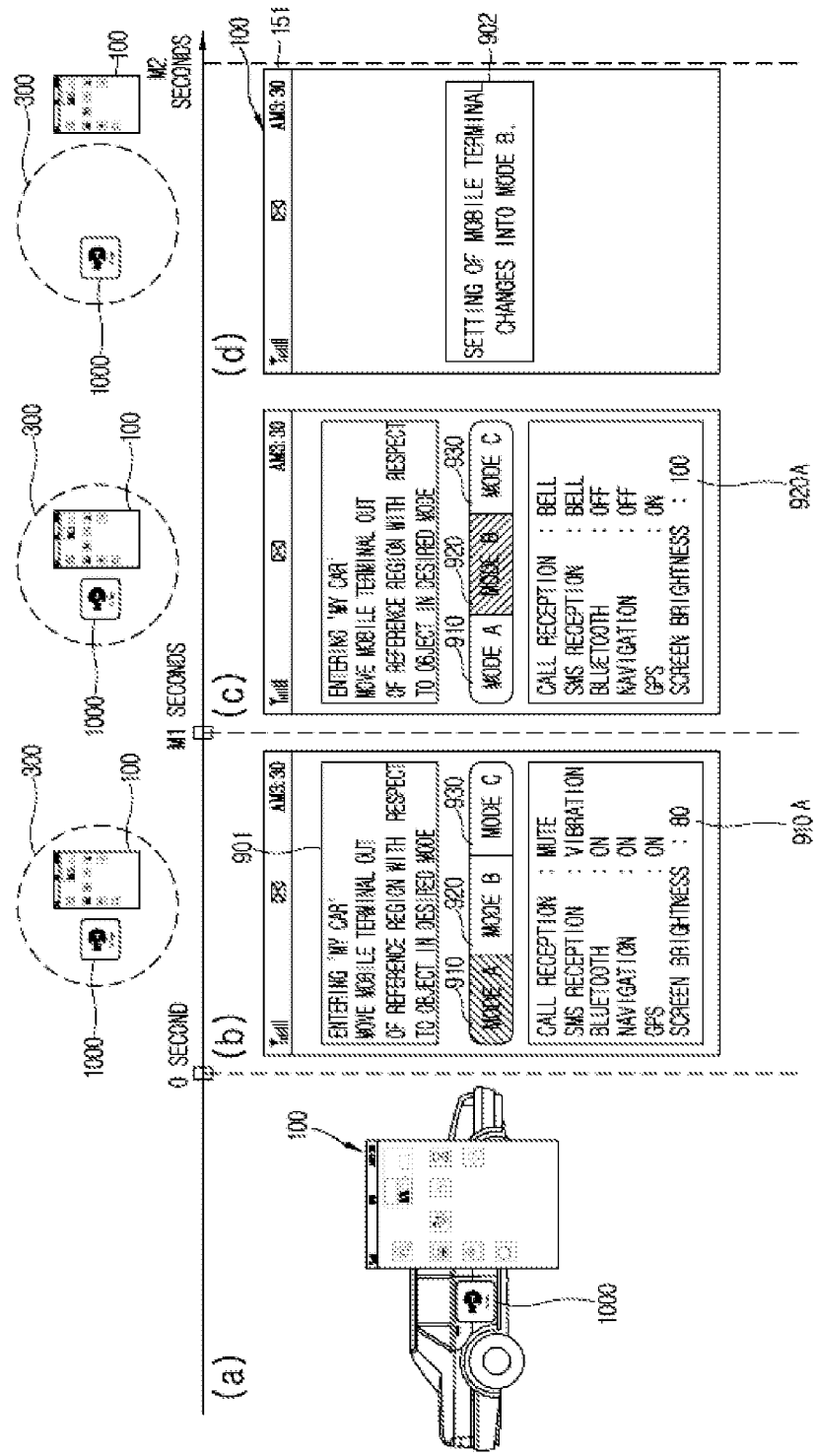

MOBILE TERMINAL AND CONTROL METHOD THEREOF

CROSS-REFERENCE TO RELATED APPLICATIONS

Pursuant to 35 U.S.C. §119(a), this application claims the benefit of earlier filing date and right of priority to Korean Application No. 10-2012-0074067, filed on Jul. 6, 2012, the contents of which are hereby incorporated by reference herein in its entirety.

BACKGROUND OF THE INVENTION

1. Field of the Invention

The present disclosure relates to a mobile terminal, and particularly, to a mobile terminal capable of performing near field communication (NFC) with other devices capable of performing the NFC, and a method for controlling the same.

2. Description of Related Art

A mobile terminal performs various functions such as a data and voice communication function, a still or moving image capturing function using a camera, a voice storage function, a music file playing function through a speaker, and an image or video display function. Some mobile terminals include an additional function for playing games, and other mobile terminals are implemented as a multimedia device. Recent mobile terminals allow watching video or television programs by receiving broadcast or multicast signals. Various attempts have been made to implement complicated functions in such a multimedia device by means of hardware or software.

The mobile terminal provides various services as the communication technology is improved and a user's desire increases. Among such various services, a Near Field Communication (NFC) service is mainly used in near field communication (short-range communication), which is used in data communication. The NFC service is a type of Radio-frequency identification (RFID) which uses a specific frequency region, for example, 13.56 Mhz.

In the conventional art, in case of performing a direct input to the mobile terminal which is performing near field communication with an NFC tag or other NFC-enabled mobile terminal, a touch input or a key input should be performed on the mobile terminal while contacting said NFC tag or other NFC mobile terminal. This may cause a user's inconvenience.

SUMMARY OF THE INVENTION

According to an example embodiment of the present invention, a mobile terminal includes a communication unit for performing near field communication (NFC) with a detected object and receiving data from the object; a display; and a controller monitoring time duration for which the terminal remains within a first threshold distance relative to the object; identify each of a plurality of time thresholds respectively occurring during the time duration; and cause the display to sequentially display a plurality of different data responsive to an occurrence of a corresponding time threshold of the plurality of time thresholds. Each of the plurality of different data corresponds to one of the plurality of time thresholds and the plurality of different data is based on the data received from the object.

According to another example embodiment of the present invention, a method for controlling a mobile terminal includes detecting an object configured to perform near field communication (NFC) with the terminal; receiving data from the detected object; monitoring time duration for which the terminal remains within a first threshold distance relative to the object; identifying each of a plurality of time thresholds respectively occurring during the time duration; and sequentially displaying a plurality of different data responsive to an occurrence of a corresponding time threshold of the plurality of time thresholds. Each of the plurality of different data corresponds to one of the plurality of time thresholds and the plurality of different data is based on the data received from the object.

Further scope of applicability of the present application will become more apparent from the detailed description given hereinafter. However, it should be understood that the detailed description and specific examples, while indicating example embodiments of the invention, are given by way of illustration only, since various changes and modifications within the spirit and scope of the invention will become apparent to those skilled in the art from the detailed description.

BRIEF DESCRIPTION OF THE DRAWINGS

The accompanying drawings, which are included to provide a further understanding of the invention and are incorporated in and constitute a part of this specification, illustrate exemplary embodiments and together with the description serve to explain the principles of the invention.

FIGS. 4A to 4C are diagrams for explaining the method exemplified in FIG. 3.

FIG. 5 is a flowchart showing a method for performing near field communication (NFC) with an NFC-enabled tag, by a mobile terminal according to an example embodiment of the present invention.

FIGS. 7A to 7C are diagrams for explaining a method for providing notification information in a mobile terminal according to an example embodiment of the present invention.

FIGS. 8A to 8C are diagrams for explaining a method for selecting a peer to peer connection method based on a time duration for which a mobile terminal is positioned within a reference region with respect to an object, according to an example embodiment of the present invention.

FIGS. 9A to 9D are diagrams for explaining a method for selecting setting information based on a time duration for which a mobile terminal is positioned within a reference region with respect to an object, according to an example embodiment of the present invention.

DETAILED DESCRIPTION OF THE INVENTION

Description will now be given in detail of the exemplary embodiments, with reference to the accompanying drawings. For the sake of brief description with reference to the drawings, the same or equivalent components will be provided with the same reference numbers, and description thereof will not be repeated.

Hereinafter, example embodiments of the present invention will be explained in more detail with reference to the attached drawings. The suffixes attached to components of the wireless speaker, such as 'module' and 'unit or portion' were used for facilitation of the detailed description. Therefore, the suffixes do not have different meanings from each other.

The mobile terminal according to the present invention may include a smart phone, a laptop computer, a digital broadcasting terminal, a Personal Digital Assistant (PDA), a Portable Multimedia Player (PMP), a navigation system, a slate PC, a tablet PC, an ultra book, and the like. However, it will be obvious to those skilled in the art that the present invention may be also applicable to a fixed terminal such as a digital TV and a desktop computer, except for specific configurations for mobility.

Figure 1:
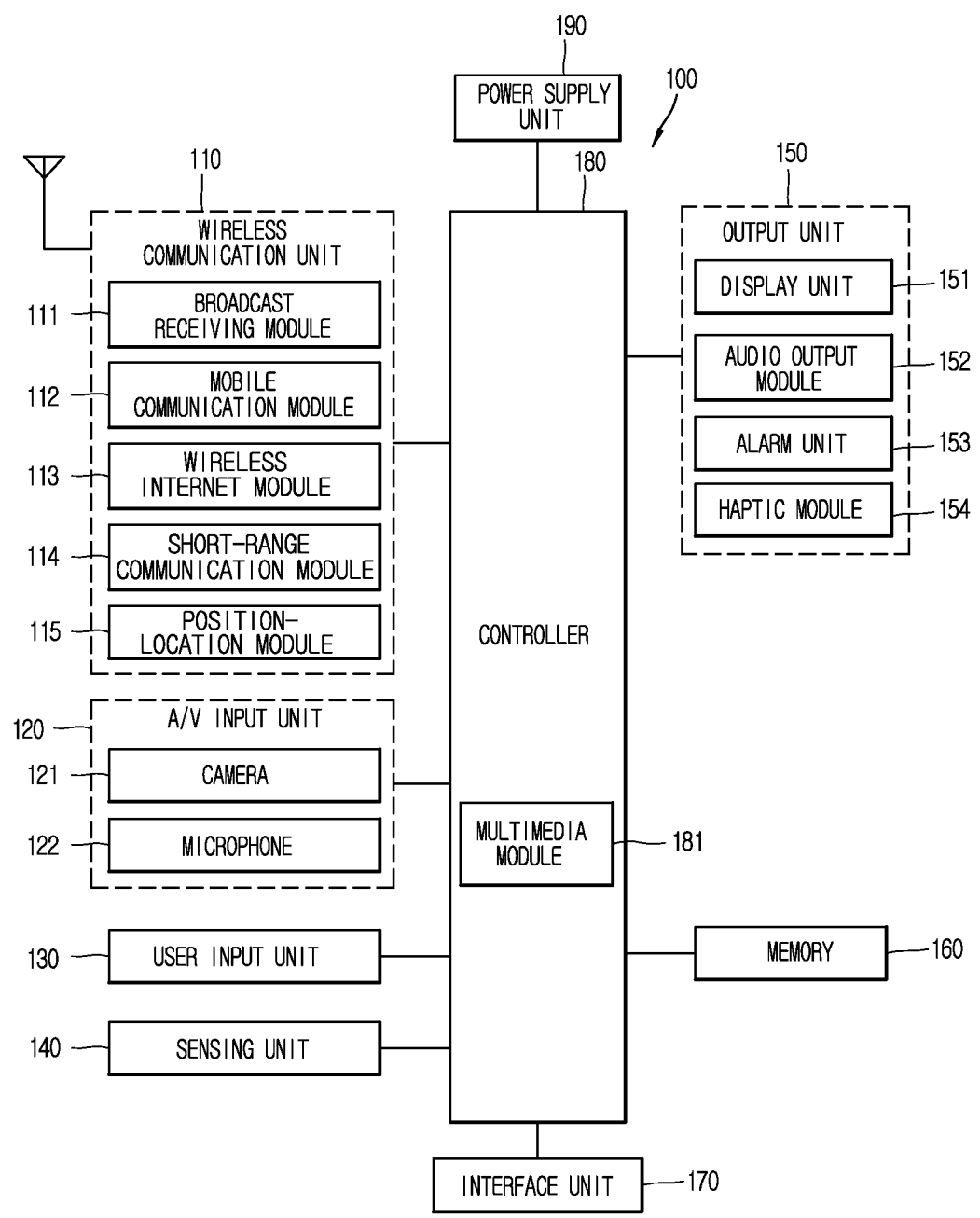
FIG. 1 is a block diagram of a mobile terminal according to an example embodiment of the present invention.

FIG. 1 is a block diagram of a mobile terminal according to an example embodiment of the present invention. As shown in FIG. 1, the mobile terminal 100 includes a wireless communication unit 110, an A/V (Audio/Video) input unit 120, a user input unit 130, a sensing unit 140, an output unit 150, a memory 160, an interface unit 170, a controller 180, and a power supply unit 190. FIG. 1 shows the mobile terminal 100 having various components, but it is understood that implementing all of the illustrated components is not a requirement. The mobile terminal 100 may be implemented by greater or fewer components. Hereinafter, each of the above components will be explained.

The wireless communication unit 110 typically includes one or more components to authorize wireless or radio communication between the mobile terminal 100 and a radio communication unit system or a network in which the mobile terminal 100 is located. For example, the wireless communication unit 110 may include a broadcast receiving module 111, a mobile communication module 112, a wireless Internet module 113, a short range communication module 114, a position-location module 115, and the like.

The broadcast receiving module 111 receives broadcast signals and/or broadcast associated information from an external broadcast management server (or other network entity) via a broadcast channel. The broadcast channel may include a satellite channel and/or a terrestrial channel. The broadcast management server may be a server that generates and transmits a broadcast signal and/or broadcast associated information or a server that receives a previously generated broadcast signal and/or broadcast associated information and transmits the same to a terminal. The broadcast signal may include a TV broadcast signal, a radio broadcast signal, a data broadcast signal, and the like. Also, the broadcast signal may further include a broadcast signal combined with a TV or radio broadcast signal.

The broadcast associated information may refer to information associated with a broadcast channel, a broadcast program or a broadcast service provider. The broadcast associated information may also be provided via a mobile communication network and received by the mobile communication module 112.

The broadcast associated information may exist in various forms. For example, it may exist in the form of an electronic program guide (EPG) of digital multimedia broadcasting (DMB), electronic service guide (ESG) of digital video broadcast-handheld (DVB-H), and the like.

The broadcast receiving module 111 may be configured to receive signals broadcast by using various types of broadcast systems. In particular, the broadcast receiving module 111 may receive a digital broadcast by using a digital broadcast system such as multimedia broadcasting-terrestrial (DMB-T), digital multimedia broadcasting-satellite (DMB-S), digital video broadcast-handheld (DVB-H), the data broadcasting system known as media forward link only (MediaFLO®), integrated services digital broadcast-terrestrial (ISDB-T) and the like. The broadcast receiving module 111 may be configured to be suitable for every broadcast system that provides a broadcast signal as well as the above-mentioned digital broadcast systems. Broadcast signals and/or broadcast-associated information received via the broadcast receiving module 111 may be stored in the memory 160.

The mobile communication module 112 transmits and/or receives radio signals to and/or from at least one of a base station, an external terminal and a server. Such radio signals may include a voice call signal, a video call signal or various types of data according to text and/or multimedia message transmission and/or reception.

The mobile communication module 112 is configured to implement a video call mode and a voice call mode. The video call mode indicates a call performed while a user views counterpart, whereas the voice call mode indicates a call performed while a user does not view counterpart. For implementation of the video call mode and the voice call mode, the mobile communication module 112 is configured to transmit and receive at least one of voice data and image data.

The wireless Internet module 113 supports wireless Internet access for the mobile terminal 100. This module may be internally or externally coupled to the mobile terminal 100. Here, as the wireless Internet technique, a wireless local area network (WLAN), Wi-Fi, wireless broadband (WiBro), world interoperability for microwave access (WiMAX), high speed downlink packet access (HSDPA), and the like, may be used.

The short-range communication module 114 is a module for supporting short range communications. Some examples of short range communication technology include Bluetooth™, Radio Frequency IDentification (RFID), Infrared Data Association (IrDA), Ultra-WideBand (UWB), ZigBee™, and the like.

The position-location module 115 is a module for acquiring a location (or position) of the mobile terminal 100. For example, the position-location module 115 may include a GPS (Global Positioning System) module.

Referring to FIG. 1, the A/V input unit 120 is configured to receive an audio or video signal. The A/V input unit 120 may include a camera 121 and a microphone 122. The camera 121 processes image data of still pictures or video acquired by an image capture device in a video capturing mode or an image capturing mode. The processed image frames may be displayed on a display unit 151.

The image frames processed by the camera 121 may be stored in the memory 160 or transmitted via the wireless communication unit 110. Two or more cameras 121 may be provided according to the configuration of the mobile terminal 100.

The microphone 122 may receive sounds (audible data) in a phone call mode, a recording mode, a voice recognition mode, and the like, and can process such sounds into audio data. The processed audio (voice) data may be converted for output into a format transmittable to a mobile communication base station via the mobile communication module 112 in case of the phone call mode. The microphone 122 may implement various types of noise canceling (or suppression) algorithms to cancel (or suppress) noise or interference generated in the course of receiving and transmitting audio signals.

The user input unit 130 may generate key input data from commands entered by a user to control various operations of the mobile terminal 100. The user input unit 130 allows the user to enter various types of information, and may include a keypad, a dome switch, a touch pad (e.g., a touch sensitive member that detects changes in resistance, pressure, capacitance, etc. due to being contacted) a jog wheel, a jog switch, and the like.

The sensing unit 140 detects a current status (or state) of the mobile terminal 100 such as an opened or closed state of the mobile terminal 100, a location of the mobile terminal 100, the presence or absence of a user's touch (contact) with the mobile terminal 100 (e.g., touch inputs), the orientation of the mobile terminal 100, an acceleration or deceleration motion and direction of the mobile terminal 100, etc., and generates commands or signals for controlling the operation of the mobile terminal 100. For example, when the mobile terminal 100 is implemented as a slide type mobile phone, the sensing unit 140 may sense whether the slide phone is opened or closed. In addition, the sensing unit 140 can detect whether or not the power supply unit 190 supplies power or whether or not the interface unit 170 is coupled with an external device.

The output unit 150 is configured to provide outputs in a visual, audible, and/or tactile manner (e.g., audio signal, video signal, alarm signal, vibration signal, etc.). The output unit 150 may include the display unit 151, an audio output module 152, an alarm unit 153, a haptic module 154, and the like.

The display unit 151 may display information processed in the mobile terminal 100. For example, when the mobile terminal 100 is in a phone call mode, the display unit 151 may display a User Interface (UI) or a Graphic User Interface (GUI) associated with a call. When the mobile terminal 100 is in a video call mode or image capturing mode, the display unit 151 may display a captured image and/or received image, a UI or GUI.

The display unit 151 may include at least one of a Liquid Crystal Display (LCD), a Thin Film Transistor-LCD (TFT-LCD), an Organic Light Emitting Diode (OLED) display, a flexible display, a three-dimensional (3D) display, and an e-ink display.

Some of these displays may be configured to be transparent so that outside may be seen therethrough, which may be referred to as a transparent display. A representative example of this transparent display may include a transparent organic light emitting diode (TOLED). The mobile terminal 100 may include two or more displays units 151. The rear surface portion of the display unit 151 may also be implemented to be optically transparent. Under this configuration, a user can view an object positioned at a rear side of a body through a region occupied by the display unit 151 of the body.

The display unit 151 may be implemented in two or more in number according to a configured aspect of the mobile terminal 100. For instance, a plurality of displays may be arranged on one surface integrally or separately, or may be arranged on different surfaces.

Here, if the display unit 151 and a touch sensitive sensor (referred to as a touch sensor) have a layered structure therebetween, the structure may be referred to as a touch screen. The display unit 151 may be used as an input device rather than an output device. The touch sensor may be implemented as a touch film, a touch sheet, a touch pad, and the like.

The touch sensor may be configured to convert changes of a pressure applied to a specific part of the display unit 151, or a capacitance occurring from a specific part of the display unit 151, into electric input signals. Also, the touch sensor may be configured to sense not only a touched position and a touched area, but also a touch pressure.

When touch inputs are sensed by the touch sensors, corresponding signals are transmitted to a touch controller (not shown in the drawing). The touch controller processes the received signals, and then transmits corresponding data to the controller 180. Accordingly, the controller 180 may sense which region of the display unit 151 has been touched.

In one embodiment, a proximity sensor (not shown in the drawing) may be arranged at an inner region of the mobile terminal 100 covered by the touch screen, or near the touch screen. The proximity sensor indicates a sensor to sense presence or absence of an object approaching to a surface to be sensed, or an object disposed near a surface to be sensed, by using an electromagnetic field or infrared rays without a mechanical contact. The proximity sensor may have a longer lifespan and a more enhanced utility than a contact sensor.

The proximity sensor may include a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, proximity of a pointer to the touch screen is sensed by changes of an electromagnetic field. In this case, the touch screen (touch sensor) may be categorized into a proximity sensor.

In the following description, for the sake of brevity, recognition of the pointer positioned to be close to the touch screen without being contacted will be called a 'proximity touch', while recognition of actual contacting of the pointer on the touch screen will be called a 'contact touch'. In this case, when the pointer is in the state of the proximity touch, it means that the pointer is positioned to correspond vertically to the touch screen. For example, the pointer may be a finger.

The proximity sensor detects a proximity touch and a proximity touch pattern (e.g., a proximity touch distance, a proximity touch speed, a proximity touch time, a proximity touch position, a proximity touch motion state, or the like), and information corresponding to the sensed proximity touch operation and the proximity touch pattern can be output to the touch screen.

The audio output module 152 may output audio data received from the wireless communication unit 110 or stored in the memory 160 in a call signal reception mode, a call mode, a record mode, a voice recognition mode, a broadcast reception mode, and the like. Also, the audio output module 152 may provide audible outputs related to a particular function (e.g., a call signal reception sound, a message reception sound, etc.) performed in the mobile terminal 100. The audio output module 152 may include a receiver, a speaker, a buzzer, and the like.

The alarm unit 153 outputs a signal for informing about an occurrence of an event of the mobile terminal 100. Events generated in the mobile terminal 100 may include call signal reception, message reception, key signal inputs, and the like. In addition to video or audio signals, the alarm unit 153 may output signals in a different manner, for example, to inform about an occurrence of an event. For example, the alarm unit 153 may output a signal in the form of vibration. The video signal or audio signal may be output through the display unit 151 or the audio output module 152. Therefore, the display unit 151 and the audio output module 152 may be categorized as part of the alarm unit 153.

The haptic module 154 generates various tactile effects the user may feel. A typical example of the tactile effects generated by the haptic module 154 is vibration. The strength and pattern of the haptic module 154 can be controlled. For example, different vibrations may be combined to be output or sequentially output.

Besides vibration, the haptic module 154 may generate various other tactile effects such as an effect by stimulation such as a pin arrangement vertically moving with respect to a contact skin, a spray force or suction force of air through a jet orifice or a suction opening, a contact on the skin, a contact of an electrode, electrostatic force, etc., an effect by reproducing the sense of cold and warmth using an element that can absorb or generate heat.

The haptic module 154 may be implemented to allow the user to feel a tactile effect through a muscle sensation such as fingers or arm of the user, as well as transferring the tactile effect through a direct contact. Two or more haptic modules 154 may be provided according to the configuration of the mobile terminal 100.

The memory 160 may store software programs used for the processing and controlling operations performed by the controller 180, or may temporarily store data (e.g., a map data, phonebook, messages, still images, video, etc.) that are input or output. The memory 160 may store data relating to various patterns of vibrations and sounds output when touch input to the touch screen is sensed.

The memory 160 may include at least one type of storage medium including a Flash memory, a hard disk, a multimedia card micro type, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, and an optical disk. Also, the mobile terminal 100 may be operated in relation to a web storage device that performs the storage function of the memory 160 over the Internet.

The interface unit 170 serves as an interface with every external device connected with the mobile terminal 100. For example, the external devices may transmit data to an external device, receives and transmits power to each element of the mobile terminal 100, or transmits internal data of the mobile terminal 100 to an external device. For example, the interface unit 170 may include wired or wireless headset ports, external power supply ports, wired or wireless data ports, memory card ports, ports for connecting a device having an identification module, audio input/output (I/O) ports, video I/O ports, earphone ports, or the like.

Here, the identification module may be a chip that stores various information for authenticating the authority of using the mobile terminal 100 and may include a user identity module (UIM), a subscriber identity module (SIM) a universal subscriber identity module (USIM), and the like. In addition, the device having the identification module (referred to as 'identifying device', hereinafter) may take the form of a smart card. Accordingly, the identifying device may be connected with the terminal 100 via a port.

When the mobile terminal 100 is connected with an external cradle, the interface unit 170 may serve as a passage to allow power from the cradle to be supplied therethrough to the mobile terminal 100 or may serve as a passage to allow various command signals input by the user from the cradle to be transferred to the mobile terminal therethrough. Various command signals or power input from the cradle may operate as signals for recognizing that the mobile terminal 100 is properly mounted on the cradle.

The controller 180 typically controls the general operations of the mobile terminal 100. For example, the controller 180 performs controlling and processing associated with voice calls, data communications, video calls, and the like. The controller 180 may include a multimedia module 181 for reproducing multimedia data. The multimedia module 181 may be configured within the controller 180 or may be configured to be separated from the controller 180.

The controller 180 may perform a pattern recognition processing to recognize a handwriting input or a picture drawing input performed on the touch screen as characters or images, respectively.

Once a preset condition of the mobile terminal 100 is satisfied, the controller 180 can execute a locked state for limiting a user's input of control commands with respect to applications. And, the controller 180 can control a locked screen displayed in the locked state, based on a touch input sensed by the display (hereinafter, will be referred to as 'touch screen' 151) in the locked state.

The power supply unit 190 receives external power or internal power and supplies appropriate power required for operating respective elements and components under control of the controller 180.

Various embodiments described herein may be implemented in a computer-readable or its similar medium using, for example, software, hardware, or any combination thereof.

For hardware implementation, the embodiments described herein may be implemented by using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic units designed to perform the functions described herein. In some cases, such embodiments may be implemented by the controller 180 itself.

For software implementation, the embodiments such as procedures or functions described herein may be implemented by separate software modules. Each software module may perform one or more functions or operations described herein.

Software codes can be implemented by a software application written in any suitable programming language. The software codes may be stored in the memory 160 and executed by the controller 180.

Hereinafter, a structure of the mobile terminal of FIG. 1 according to an example embodiment of the present invention will be explained.

Figure 2A:
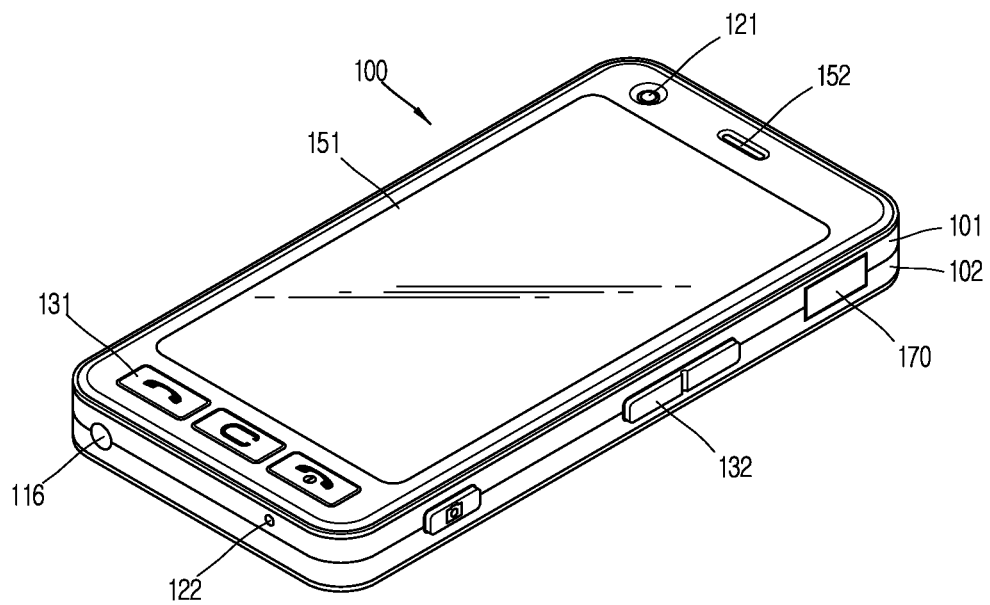
FIG. 2A is a front perspective view of a mobile terminal according to an example embodiment of the present invention.
Figure 2B:
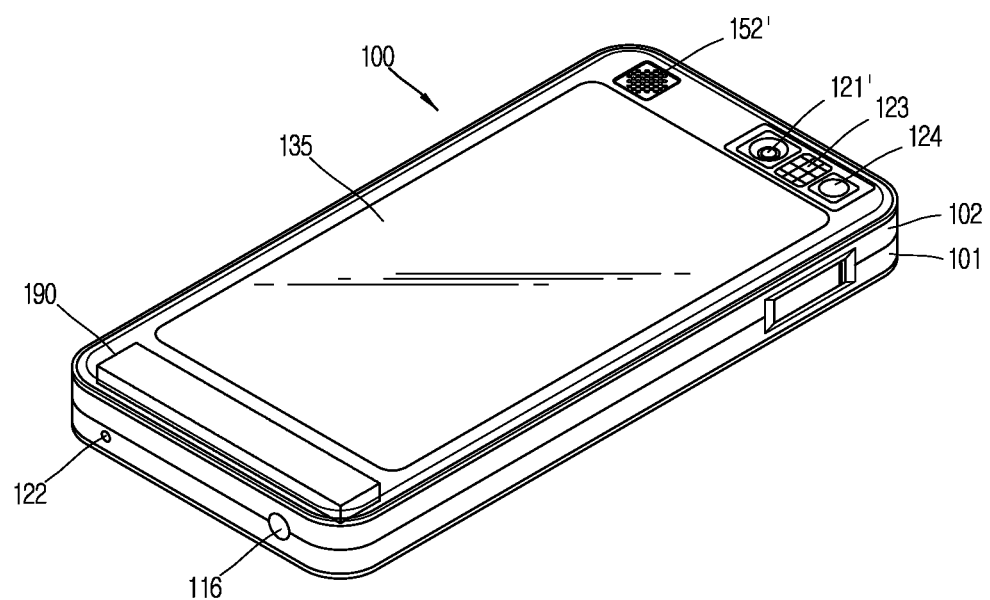
FIG. 2B is a rear perspective view of a mobile terminal according to an example embodiment of the present invention.

FIG. 2A is a front perspective view of the mobile terminal according to an example embodiment of the present invention, and FIG. 2B is a rear perspective view of the mobile terminal according to an example embodiment of the present invention Although the mobile terminal 100, as exemplified in FIGS. 2A and 2B is a bar type mobile terminal, the present disclosure is not limited to this type, but may be applied to a slide type, in which two or more bodies are coupled to each other so as to perform a relative motion, a folder type, or a swing type, a swivel type and the like.

Referring to FIGS. 2A and 2B, a body of the mobile terminal 100 has a front surface, side surfaces and a rear surface. The body has two ends in a lengthwise direction. A case (casing, housing, cover, etc.) forming an outer appearance of the body may include a front case 101 and a rear case 102. A space formed by the front case 101 and the rear case 102 may accommodate various components therein. At least one intermediate case may further be disposed between the front case 101 and the rear case 102. Such cases may be formed by injection-molded synthetic resin, or may be formed using a metallic material such as stainless steel (STS) or titanium (Ti).

At the front case 101, may be disposed a display unit 151, an audio output module 152, a camera 121, a user input unit 130 including a first user input unit 131 and a second user input unit 132, a microphone 122, an interface unit 170, and the like.

The display unit 151 occupies most parts of a main surface of the front case 101. The audio output module 152 and the camera 121 are arranged at a region adjacent to one end of the stereoscopic display unit 151, and the first user input unit 131 and the microphone 122 are arranged at a region adjacent to another end of the display unit 151. The first user input unit 131, the interface unit 170, and the like may be arranged on side surfaces of the front case 101 and the rear case 102. The microphone 122 is disposed at another end of the body.

The user input unit 130 is manipulated to receive a command for controlling the operation of the mobile terminal 100, and may include a plurality of user input units 131 and 132. The user input units may be referred to as manipulating portions, and may include any type of ones that can be manipulated in a user's tactile manner.

Commands inputted through the first or second user input units 131 or 132 may be variously set. For instance, the first user input unit 131 is configured to input commands such as START, END, SCROLL or the like, and the second user input unit 132 is configured to input commands for controlling a level of sound outputted from the audio output module 152, or commands for converting the current mode of the display unit 151 to a touch recognition mode.

Referring to FIG. 2B, an audio output unit 152' may be additionally disposed at the rear case 102. The audio output unit 152' may implement a stereo function together with the audio output unit 152 (refer to FIG. 2A), and may be used for calling in a speaker phone mode.

A power supply unit 190 for supplying power to the mobile terminal 100 is mounted to the body. The power supply unit 190 may be mounted in the body, or may be detachably mounted to the body.

A touch pad 135 for sensing touch may be additionally mounted to the rear case 102. Like the display unit 151, the touch pad 135 may be formed to be light-transmissive. In this case, if the display unit 151 is configured to output visual information from two surfaces thereof, the visual information can be recognized through the touch pad 135. The information output from the two surfaces can be controlled by the touch pad 135. Alternatively, a display may be additionally mounted to the touch pad 135, so that a touch screen can be disposed at the rear case 102.

A second camera 121' may be additionally provided on the rear case 102. The camera 121' faces a direction which is opposite to a direction faced by the camera 121 (refer to FIG. 2A), and may have different pixels from those of the camera 121.

For example, the camera 121 may operate with relatively lower pixels (lower resolution). Thus, the camera 121 may be useful when a user can capture his face and send it to another party during a video call or the like. On the other hand, the camera 121' may operate with a relatively higher pixels (higher resolution) such that it can be useful for a user to obtain higher quality pictures for later use. The cameras 121 and 121' may be installed at the body so as to rotate or pop-up.

A flash 123 and a mirror 124 may be additionally disposed adjacent to the camera 121'. The flash 123 operates in conjunction with the camera 121' when taking a picture using the camera 121'. The mirror 124 can cooperate with the camera 121' to allow a user to photograph himself in a self-portrait mode.

An audio output unit 152' may be additionally arranged on a rear surface of the body. The audio output unit 152' (refer to FIG. 2A) may cooperate with the audio output unit 152 (refer to FIG. 2A) so as to implement a stereo function. Also, the audio output unit 152' may be configured to operate as a speakerphone.

A power supply unit 190 for supplying power to the mobile terminal 100 is mounted to the body. The power supply unit 190 may be mounted in the body, or may be detachably mounted to the body.

The touch pad 135 operates in association with the display unit 151 of the front case 101. The touch pad 135 may be disposed on the rear surface of the display unit 151 in parallel. The touch pad 135 may have a size equal to or smaller than that of the display unit 151.

The wireless communication unit 110 (refer to FIG. 1) of the mobile terminal 100 can transmit or receive data to/from other NFC-enabled object, using the short-range communication module 114. The short-range communication module 114 is configured to recognize an object through a short-range radio signal, for example, using a frequency region of 13.56 MHz, a type of RFID. The short-range communication is near field communication (NFC), which may be called near field radio communication, near field magnetic communication, or neighboring magnetic communication.

As a user moves the mobile terminal 100 close to an object, for example, within the range of several centimeters (cm) to several tens of centimeters (cm) through near field communication (NFC), bi-directional data communication, such as payment transaction, information search and file exchange, can be performed in various manners.

In the present disclosure, the object may be an NFC-enabled mobile terminal or payment terminal, or an NFC-enabled tag, sticker or card having specific information stored therein. That is, the object may be any type of NFC-enabled external devices except for the mobile terminal 100 and may include an NFC-enabled memory, sticker, card, tag, and the like The wireless communication unit 110 may perform a function of a card emulator, a reader and a P2P through short range radio communication with the object. For instance, when the recognized object is a card terminal, the mobile terminal 100 can operate with an RFID card. In this case, if the terminal 100 is positioned close to the card terminal, the card terminal can perform data communication for payment transaction with the wireless communication unit 110 of the mobile terminal 100.

When two or more mobile terminals are positioned within a range that allows recognition of the other mobile terminal(s), the mobile terminals may share data, such as phone numbers and photos, by a Peer to Peer (P2P) function.

When a recognized object is a tag or a sticker or a card each having a micro chip therein, the wireless communication unit 110 may perform a function of a reader which reads information stored in the tag, the sticker or the card.

The mobile terminal 100 can perform NFC (or data communication) with an NFC-enabled object when positioned within a reference region (NFC-enabled distance) with respect to the object. Here, the NFC-enabled distance or reference region refers to a space that allows the mobile terminal 100 to detect the object. Regardless of whether the mobile terminal 100 approaches to the object, or whether the object approaches to the mobile terminal 100, when the mobile terminal is within the reference region the mobile terminal is within an NFC-enabled distance with respect to the object.

The controller 180 may process different types of data based on a time duration for which the mobile terminal 100 is positioned within the reference region. That is, the controller 180 may count a time duration for which the mobile terminal 100 is positioned within the reference region when the object is detected, and provide information on different types of data to a user according to the counted time duration. Then, the controller 180 may perform a specific function corresponding to the counted time duration.

The mobile terminal 100 processes different types of data based on a time duration for which the mobile terminal 100 is positioned within the reference region (NFC-enabled distance) with respect to an NFC-enabled object. Therefore, the mobile terminal 100 can perform various functions without receiving a control command from a user via the user input unit 130. In other words, various functions may be performed as long as the mobile terminal 100 is positioned within the reference region for a threshold time period. Further, depending on how long the mobile terminal 100 is positioned within the reference region, different functions may be performed according to different threshold time periods or time durations.

In the present disclosure, "data communication" or "data transmission/reception" means exchanging information between the mobile terminal 100 and the object, i.e., performing a function of a card emulator, a reader and a P2P upon recognition of the mobile terminal and the object using a short range radio signal.

Hereinafter, a method for processing different types of data based on a time duration for which the mobile terminal 100 is positioned within a reference region, according to an example embodiment of the present invention, will be explained in more details with reference to FIG. 3 and FIGS. 4A to 4C.

Figure 3:
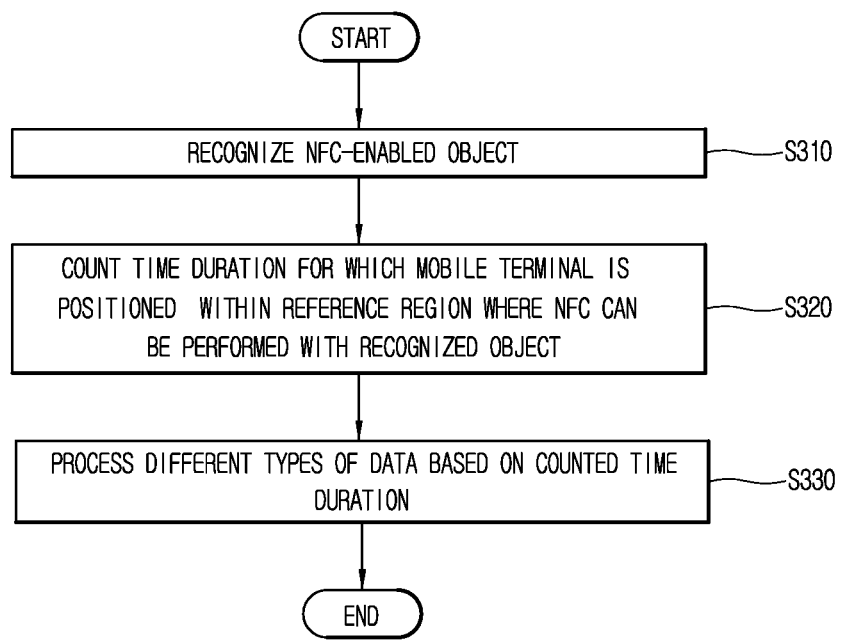
FIG. 3 is a flowchart showing a method for controlling a mobile terminal according to an example embodiment of the present invention.
Figure 4C:
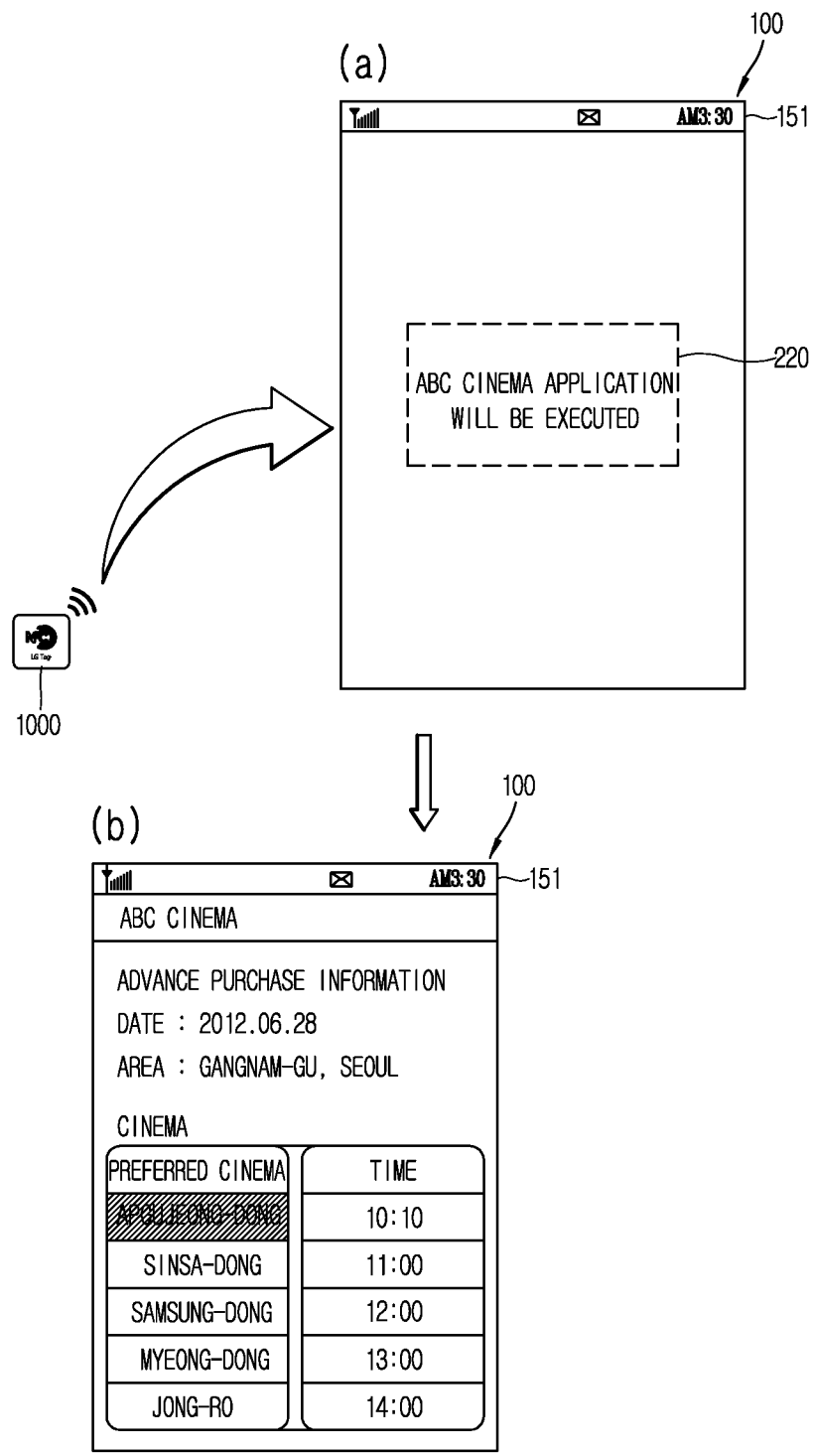

FIG. 3 is a flowchart showing a method for controlling a mobile terminal according to an example embodiment of the present invention, and FIGS. 4A to 4C are diagrams for explaining the method for controlling a mobile terminal according to the example embodiment described in FIG. 3.

Referring to FIG. 3, when the mobile terminal 100 approaches to an NFC-enabled object or vice versa, the wireless communication unit 110 recognizes the object (S310). Here, "recognizing the object" means identifying the object with which the mobile terminal 100 is to perform data communication through NFC. Further, "approaching to an NFC-enabled object" means that the mobile terminal 100 is positioned within a reference region where NFC can be performed with the object. The range of the reference region may be variable according to a recognized object, and may also be variable according to the intensity of a radio signal generated by the same object.

Once an NFC-enabled object is recognized in S310, the controller 180 starts to monitor time duration for which the mobile terminal 100 is positioned within the reference region or remains within a threshold distance relative to the object (S320). Then, the controller 180 processes a plurality of different data based on various time durations or a plurality of time thresholds for which the mobile terminal 100 remains within the reference region (S330). Here, the data may be data received from an object, or data pre-stored in the memory 160.

More specifically, the controller 180 processes the plurality of different data at preset time intervals while the mobile terminal 100 is positioned within the reference region. Information on the preset time intervals may be included in the data received from the object, or may be set based on a user's setting or the controller's setting.

For instance, if the preset time interval is 2 seconds and data having 4 information units are received from an object, the controller 180 may sequentially process the 4 information units at time intervals of 2 seconds. And, the controller 180 may sequentially output, via the display unit 151, different screen information corresponding to the plurality of different data processed at the preset time intervals, based on a type, a form and content of the data.

Referring to FIG. 4A(a), if the mobile terminal 100 approaches to an object 1000, for example, a tag having specific information stored therein and having therein an NFC-enabled micro chip, i.e., if the mobile terminal 100 is within a reference region with respect to the object 1000, the controller 180 receives the information (data) stored in the object 1000 through NFC via the wireless communication unit 110. Then, the controller 180 may output the received data sequentially via the display unit 151, rather than outputting all of the received data at once. For instance, if data received from the object 1000 has 5 information units, the controller 180 processes the 5 information units one by one at preset time intervals while the mobile terminal 100 is positioned within the reference region.

As shown in FIG. 4A(b), if 'cinema'-related information is stored in the object 1000, the controller 180 outputs, via the display unit 151, first screen information 201 corresponding to first data among the received data. Then, as shown in FIG. 4A(c), if a preset time interval ('m' seconds) lapses since the first screen information 201 has been displayed on the display unit 151, the controller 180 controls second screen information 202 corresponding to second data to be output to the display unit 151.

In one example embodiment, the controller 180 outputs an indicator at least visually, audibly, audiovisually, or tactually via the output unit 150 when the mobile terminal 100 detects the object 1000 or when the mobile terminal 100 is within the reference region. Further, the indicator may be output continuously or periodically while the mobile terminal 100 is within the reference region.

In another example embodiment, if the mobile terminal 100 is positioned near the boundary of the reference region while the first screen information 201 is being displayed as shown in FIG. 4A(b), for example, when the mobile terminal 100 is positioned at a threshold distance from the boundary, the controller 180 may output a warning signal via the output unit 150 indicating that the mobile terminal 100 is near the boundary such that the user of the mobile terminal 100 positions the mobile terminal properly within the reference region to keep the first screen information 201 being output or to continue performing the function being performed.

Further, still referring to FIG. 4A(b), if the mobile terminal 100 moves away from the tag 100 and gets out of the reference region, the controller 180 may stop displaying the first screen information 201 immediately after the mobile terminal 100 is positioned out of the reference region or after a preset time period since the mobile terminal 100 moves out of the reference region. Furthermore, the controller 180 may output a warning signal via the output unit 150 upon detecting that the mobile terminal 100 is no longer within the reference region, still displaying the first screen information 201 such that the user of the mobile terminal 100 may move the mobile terminal 100 back to the reference region to continue displaying the first screen information 201. In this case, if the mobile terminal 100 is not re-positioned within the reference region within a threshold time limit, the controller 180 may stop displaying the first screen information 201.

If the mobile terminal 100 continues to be positioned within the reference region while the second screen information 202 is displayed, as shown in FIG, 4A(c), the controller 180 outputs third screen information 203 corresponding to third data, rather than the second screen information 202, via the display unit 151 after the 'm' seconds lapse, as shown in FIG. 4A(d).

Therefore, while the mobile terminal 100 is positioned within the reference region, the controller 180 may sequentially process the data at preset time intervals such that different data or sub-data is processed one by one and/or different screen information is output one by one via the display unit 151 in each preset time interval. For example, first data may be processed during the first time interval and second data may be processed during the second time interval, and the second time interval follows the first time interval.

In an alternative example embodiment, rather than sequentially processing data while the mobile terminal 100 is positioned within the reference region, the controller 180 may perform a function associated with data processed (to be processed) at a time point when the mobile terminal 100 moves out of the reference region. If the mobile terminal 100 moves out of the reference region where NFC can be performed with the object 1000, the wireless communication unit 110 recognizes that the mobile terminal 100 has moved away from the object 1000. Then, the controller 180 performs a function associated with screen information using a control signal at a time point when the mobile terminal 100 moves out of the reference region with respect to the object 1000. Here, the screen information is data being currently processed or output to the display unit 151 after being processed, among data received from the object 1000.

As shown in FIGS. 4B(a)-(b), if the mobile terminal 100 is positioned out of the reference region, the controller 180 does not output fourth screen information that is different from the third screen information and performs a function associated with the third screen information 203 shown in FIG. 4A(d). For example, the function associated with the third screen information 203 may be a function related to an advanced purchasing of a movie ticket from a movie ticket site output to the display unit 151.

In another example, the function associated with the third screen information 203 may be activating a movie ticket purchasing application corresponding to the movie ticket site output to the display unit 151, as shown in FIGS. 4C(a)-(b). For example, when the mobile terminal 100 moves out of the reference region, the controller 180 outputs a notification 220 via the display unit 151, indicating that an activated application will be executed in response to a control signal generated by moving the mobile terminal 100 out of the reference region, as shown in FIG. 4C(a). Then, the executed application is displayed on the display unit 151, as shown in FIG. 4C(b). Furthermore, if the movie ticket purchasing application is not installed at the mobile terminal 100, the controller 180 may execute a market application or connect to an application store such that the movie ticket purchasing application may be downloaded, or may output, via the display unit 151, notification information instructing a user to download the application rather than displaying the notification 220 shown in FIG. 4C(a) (not shown in the drawing).

If the mobile terminal 100 stays within the reference region during the time interval shown in FIG. 4A(d), the controller 180 may output a notification 210 via the display unit 151, as shown in FIG. 4B(a), suggesting moving the mobile terminal 100 out of the reference region to perform a specific function related to the third screen information, for example, purchasing a movie ticket. For example, the notification 210 may be a pop-up window displayed over the third screen information displayed on the display unit 151 as shown in FIG. 4B(a). In an embodiment, the notification 210 may be output after a preset time period since the third screen information 203 has been displayed.

If the mobile terminal 100 moves away from the object 100 and the object 1000 and the mobile terminal 100 are spaced from each other by more than a predetermine distance as shown in FIG. 4B(b), i.e., if the terminal body 100 moves out of the reference region, the controller 180 may output notification information 210 indicating that a specific function is to be executed. As shown, the notification information 210 may be output via the display 151 in a visual manner. Alternatively, the notification information may be output via the audio output module 152 in an audible manner or via the haptic module 154 in a tactual manner. Further, the notification information 210 may be output in a manner of which two or more of the visual manner, audible manner, and tactual manner are combined.

If there is no additional function associated with screen information being currently processed, or output to the display unit 151 among the data received from the object 1000 at a time point when the mobile terminal 100 moves out of the reference region with respect to the object 1000, the controller 180 continues to display the screen information via the display unit 151. More specifically, even if there is additional screen information already received from the object 1000 and to be output to the display unit 151 subsequent to the current screen information, the controller 180 may not output the additional screen information. Rather, the controller 180 may continuously output the current screen information via the display unit 151. That is, a user can continuously view the current screen information by moving the mobile terminal 100 out of the reference region with respect to the object 1000.

As aforementioned, in the mobile terminal 100, the plurality of different data are processed in response to an occurrence of a corresponding time threshold of a plurality of time thresholds respectively occurring during the time duration or based on the time duration for which the mobile terminal 100 is positioned within the reference region with respect to the object 1000, for example, an NFC-enabled object. This can allow information on different types of data to be provided to a user via the output unit 150, for example, display unit 151, without receiving an additional user's control command via a physical user input unit 130. In other words, the user can have the user input recognized simply by having the mobile terminal 100 properly positioned with respect to the reference region.

For example, the controller 180 performs a function associated with processed data by recognizing that the mobile terminal 100 has moved out of the reference region with respect to the object 1000. In other words, a control signal is recognized by the controller 180 when the mobile terminal 100 has moved out of the reference region. This can allow the mobile terminal 100 not to require additionally receiving a user's control command for performing a specific function via the user input unit such as a touch screen, a keyboard, a keypad, and a button.

As aforementioned, the mobile terminal 100 may process different data or different types of data according to a time point for the terminal body to approach to or to be spaced from the object 100, and may perform different functions according to the time point. Hereinafter, a method for controlling the mobile terminal 100 according to an example embodiment of the present invention will be explained in more details. More specifically, the following is a method for processing the different data or different types of data based on a time duration for which the mobile terminal 100 is positioned within a reference region, in a case where the object 1000 recognized by the wireless communication unit 110 is a tag or a sticker or a card, each having a micro chip therein.

Figure 6:
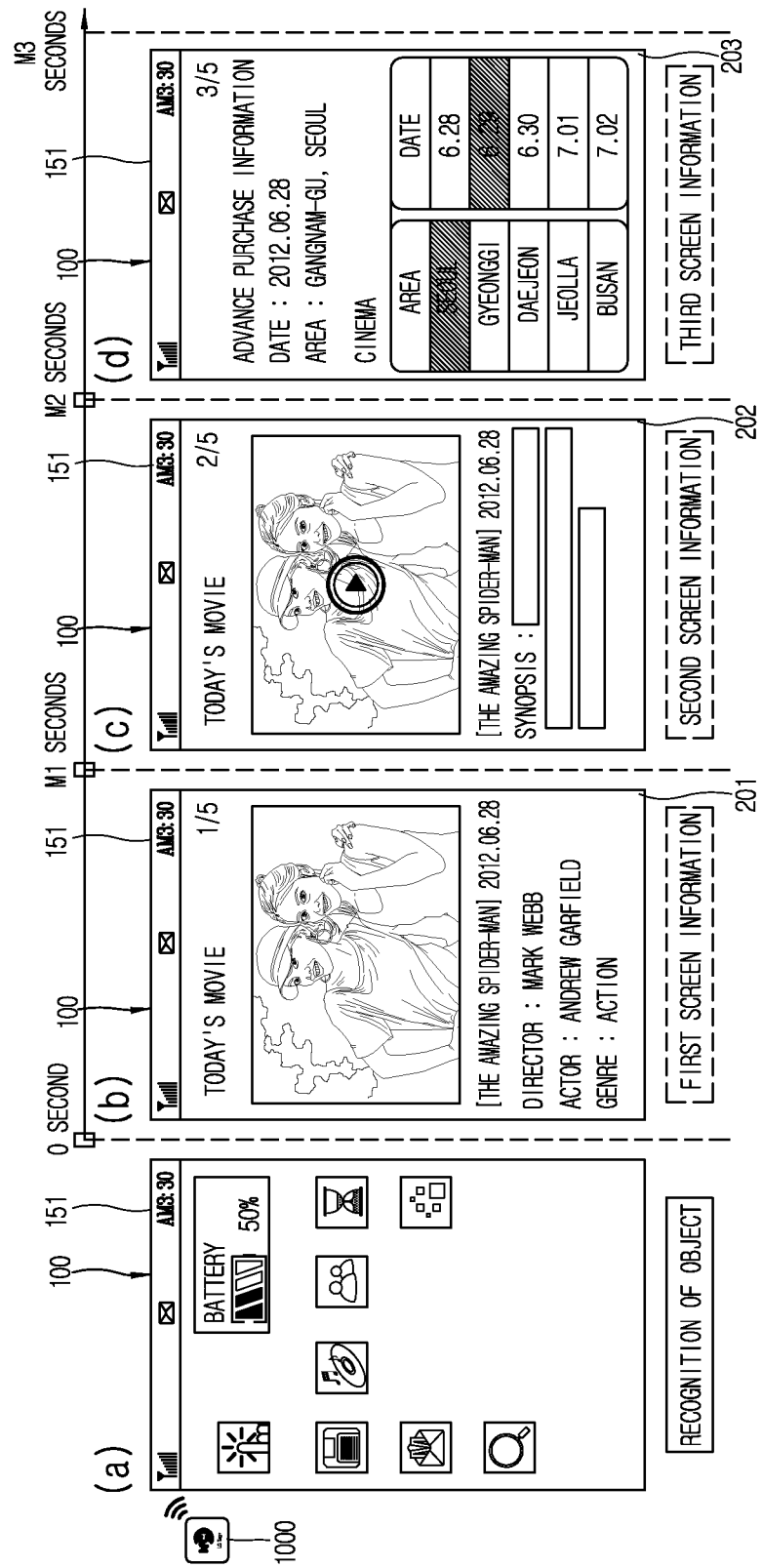
FIG. 6 is a diagram for explaining the method exemplified in FIG. 5.

FIG. 5 is a flowchart showing a method for performing near field communication (NFC) with an NFC tag by a mobile terminal according to an example embodiment of the present invention, FIG. 6 is a diagram for explaining the method for controlling a mobile terminal according to the method described in FIG. 5, and FIGS. 7A to 7C are diagrams for explaining a method for providing notification information in a mobile terminal according to an example embodiment of the present invention.

Referring to FIG. 5, when the mobile terminal 100 approaches to an NFC-enabled object, the wireless communication unit 110 recognizes the object (S510). Here, "recognizing the object" means identifying the object with which the mobile terminal is to perform data communication through NFC.

Then, the wireless communication unit 110 receives data stored in the object 1000 through NFC. Then, the controller 180 checks the number of NDEF (NFC Data Exchange Format) records included in the received data (S520). Here, the number of NDEF records may be represented as 'T'.

The NDEF record is a data storage format used in the NFC (near field radio communication) and is a unit of information. Accordingly, each NDEF record may include different information. And, a single object 1000 may include a plurality of information units consisting of a plurality of different NDEF records.

The controller 180 checks the number (T) of NDEF records included in the data received from the object 1000. Then, the controller 180 sequentially processes the data corresponding to the 'T' NDEF records one by one at time intervals of 'M' seconds while the mobile terminal 100 is positioned within a reference region.

More specifically, if the number (T) of NDEF records is more than 0 (S530), the controller 180 processes the first data, i.e., data corresponding to the N+1$^{th}$ NDEF record where N is 0 (S540). And, the controller 180 counts time duration so as to process data at preset time intervals of 'M' seconds.

After processing the first or N+1$^{th}$ NDEF record, the controller 180 determines whether the mobile terminal 100 has moved out of the reference region (S550). If it is determined that the mobile terminal 100 has moved out of the reference region, the controller 180 does not process the data any more even if there remains additional NDEF records that may be processed. In this case, the controller 180 stops counting time (S570).

Alternatively, if it is determined that the mobile terminal 100 continues to be positioned within the reference region, the controller 180 determines whether there are additional NDEF records to be processed (S560). If there are additional NDEF records to be processed as a result of the determination (S560 YES), the controller 180 processes the second data, i.e., data corresponding to the N+1$^{th}$ NDEF record where N is 1 after 'NA' seconds (S540). In other words, whenever S530 is repeated because there is an additional record to be processed in S560, N is increased by 1 for each cycle, thus (N=0) in S530 being replaced by (N=1), (N=2), and so on. On the other hand, if there remains no NDEF record to be processed as a result of the determination (S560 NO), the controller 180 stops counting time and processing the data (S570).

The controller 180 sequentially processes different NDEF records at time intervals of 'NA' seconds until there remains no NDEF record to be processed as long as the mobile terminal 100 stays within the reference region. However, when the mobile terminal 100 moves out of the reference region with respect to the object 1000, the controller 180 does not process NDEF records any more even if there remains additional NDEF records to be processed.

In the above describe example embodiment, since data corresponding to different NDEF records are processed at time intervals, each of the NDEF records is processed one at a time. This can allow information to be more efficiently provided to a user, than in a case where different types of information are provided to a user at once.

Once the NFC-enabled object 1000 is recognized as shown in FIG. 6(a), the controller 180 may process data corresponding to different types of NDEF records received from the object 1000 at time intervals of 'NA' seconds. As shown in FIG. 6(b), upon recognition of the NFC-enabled object 1000, the controller 180 outputs first screen information 201 corresponding to a first NDEF record, via the display unit 151. After a reference time (i.e., 'M1' seconds) has lapsed, the controller 180 outputs, via the display 151, second screen information 202 corresponding to a second NDEF record, as shown in FIG. 6(c). Thereafter when 'M2' seconds have lapsed, the controller 180 outputs, via the display 151, third screen information 203 corresponding to a third NDEF record, as shown in FIG. 6(d). Accordingly, while the mobile terminal 100 is positioned within the reference region with respect to the object 1000, the controller 180 may sequentially provide, to a user, screen information, i.e., first screen information 201, second screen information 202, and third screen information 203, corresponding to the data received from the object 1000.

Figure 7A:
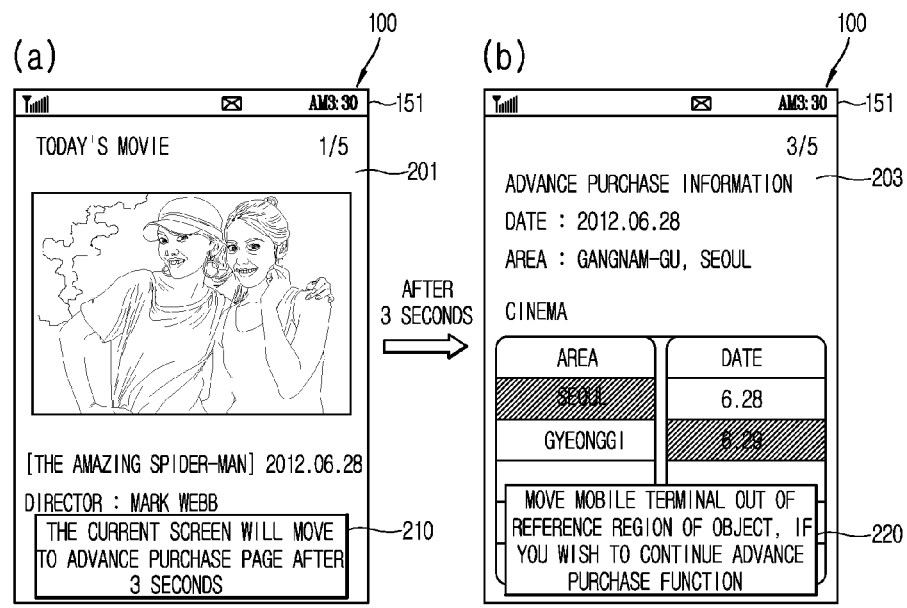

Further to the example embodiment described in FIG. 6, as shown in FIG. 7A(a), while the second screen information 201 is displayed, as shown in FIG. 6(c), the controller 180 may provide additional information corresponding to data to be processed, to a user via the output unit 150, for example, display unit 151. That is, the controller 180 may provide, to a user, information associated with data to be subsequently processed at least visually or audibly. The information may be provided immediately when the second screen information 202 is displayed or after a preset period of time since the second screen information 202 has been displayed.

Referring to FIGS. 7A(a) and 7A(b), the controller 180 may not provide a preview associated with data corresponding to an NDEF record which will follow the currently-processed NDEF record, but provides information about the order of processing the received data according to the user's preference set in the mobile terminal 100. For example, while the first NDEF record is being processed, the controller 180 may provide information corresponding to the third NDEF record to a user, on a region 210 of the screen displayed on the display unit 151.

As shown in FIG. 7A(b), the controller 180 may process data corresponding to the third NDEF record when a predetermined time, for example 3 seconds, has lapsed or if the region 210 is selected by a user in a state where a predetermined time has not lapsed. Moreover, the controller 180 may execute an additional function corresponding to the screen information being output to the display unit 151, at a time point when the mobile terminal 100 moves out of the reference region with respect to the object 1000.

Referring to FIG. 7A(b), if the mobile terminal 100 moves out of the reference region in a state when the screen information on an advanced movie ticket purchasing has been output to the display unit 151, the controller 180 may stop processing NDEF records received from the object 1000, and may execute a function corresponding to the currently displayed screen information. In FIG. 7A(b), the controller 180 may execute a movie ticket purchasing function. This was aforementioned with reference to FIGS. 4B and 4C, and thus its detailed explanations will be omitted. If there is no additional function available when the mobile terminal 100 moves out of the reference region, screen information being output may be continuously output via the display unit 151.

Further, as shown in FIG. 7A(b), the controller 180 may output guide information 220 indicating that a function corresponding to the screen information currently output via the display unit 151 can be executed by moving the mobile terminal 100 out of the reference region. The guide information 220 may be output by using at least one of visual, tactile and audible methods. In the mobile terminal 100 according to an example embodiment of the present invention, notification information on data to be processed, or guide information for executing an additional function is notified to a user, allowing the user to easily recognize a method for executing a desired function.

Figure 7B:
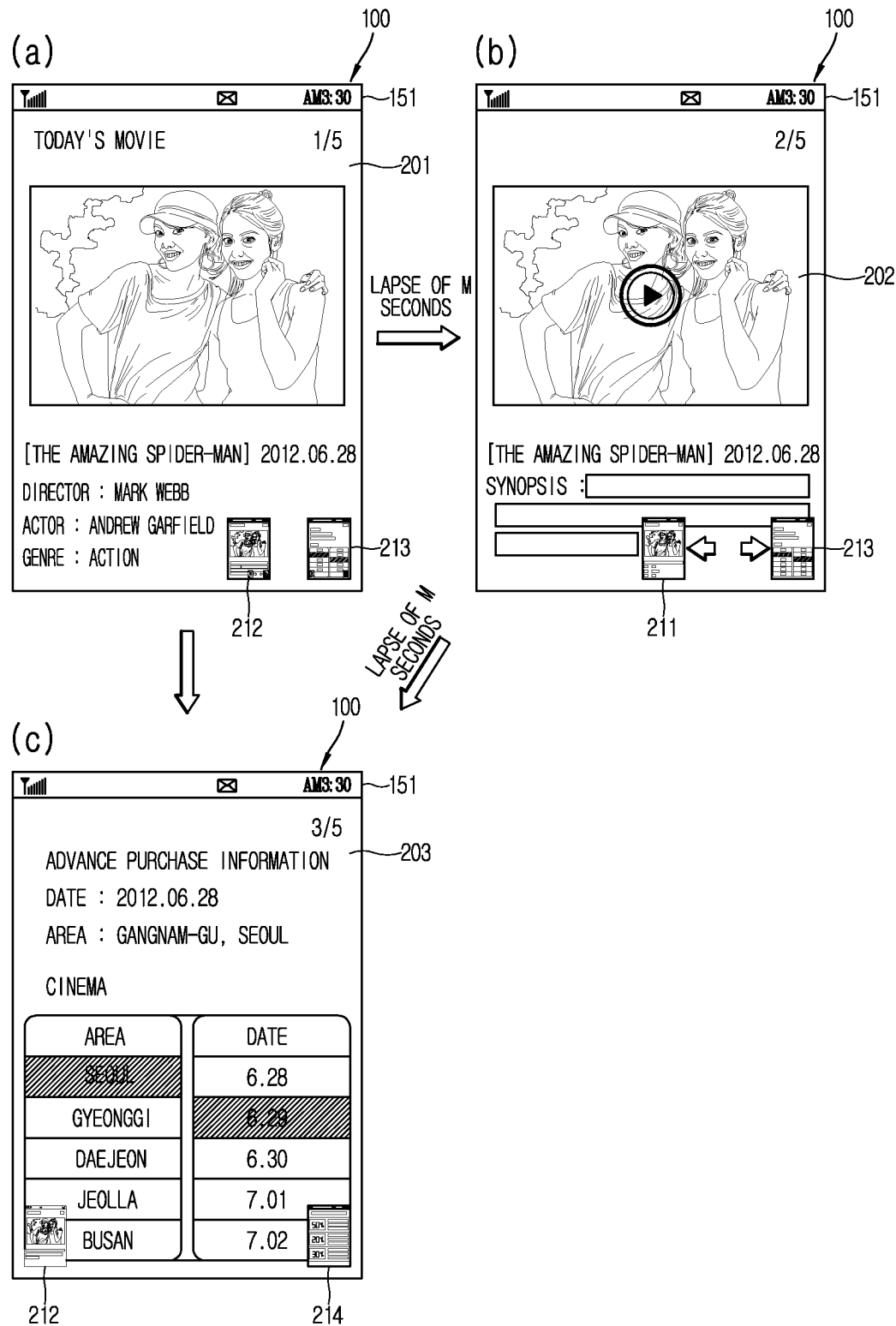

As shown in FIGS. 7B(a), (b) and (c), the controller 180 may output, via the display unit 151, screen information corresponding to a processed NDEF record or an NDEF record to be processed later, in a thumbnail manner, in addition to the screen information corresponding to an NDEF record being currently processed. Referring to FIG. 7B(a), while first screen information 201 corresponding to a first NDEF record is output, the controller 180 may output, via the display unit 151, thumbnail images 212 and 213 corresponding to second screen information 202 and third screen information 203 corresponding to second and third NDEF records, respectively.

As shown in FIG. 7B(b), while the second screen information 202 is output, the controller 180 may output, via the display unit 151, thumbnail images 211 and 213 corresponding to first screen information 201 and third screen information 203, respectively. The number of thumbnail images and an output method may vary based on a user's setting or setting by the controller 180.

As shown in FIGS. 7B(a) and (c), if a thumbnail image output via the display unit 151 is selected by a user before a predetermined time ('NA' seconds) lapses, the controller 180 may output, via the display unit 151, screen information corresponding to the selected thumbnail image. Referring to FIG. 7B(a), if the thumbnail image 213 corresponding to the third screen information 203 is selected by the user, the controller 180 may immediately output the third screen information 203 via the display unit 151, as shown in FIG. 7B(c) without displaying the second screen information 202.

As shown in FIGS. 7C(a), (b), and (c), the controller 180 may indicate the counted time, via a progress bar 220 or an image object indicating time information. Accordingly, if the user wishes to continuously view screen information being currently output, the user may simply move the mobile terminal 100 out of a reference region with respect to an object (not shown) before a preset time period is over based on the time information output via the display unit 151.

If an object 210 including "Jump to corresponding page" is selected by a user as shown in FIG. 7C(a), the controller 180 outputs, via the display unit 151, screen information 202 to be output subsequent to screen information 201 being currently output, as shown in FIG. 7C(c). Alternatively, if the user keeps the mobile terminal 100 within the reference region and do not select the object 210, the screen information 202 will be displayed when M seconds lapse, as shown in FIG. 7C(b).

As aforementioned, the mobile terminal 100 according to an example embodiment of the present invention may provide, to a user, screen information corresponding to different types of data, based on a time duration for which the mobile terminal 100 is positioned within the reference region or based on an input received from the user. Furthermore, in the mobile terminal 100 according to an example embodiment of the present invention, at least a preview about screen information that was previously output or a preview about screen information to be output later is provided to a user in advance. This allows the user to selectively access desired information.

So far, it was explained that data received from the object is sequentially output according to time. Hereinafter, a method for changing setting of the mobile terminal based on a time duration for which the terminal body is positioned within the reference region will be explained.

Figure 8B:
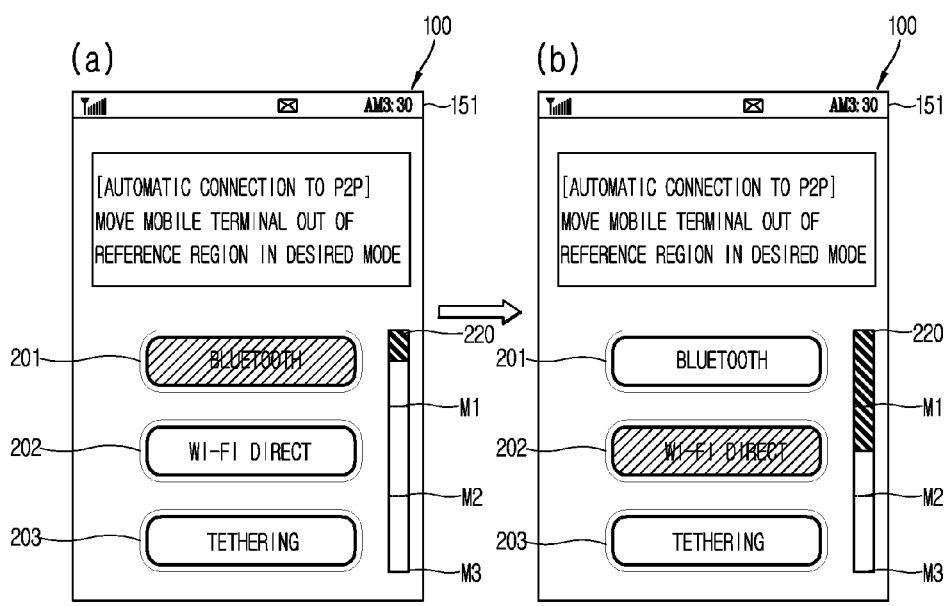

FIGS. 8A to 8C are diagrams for explaining a method for selecting a peer to peer (P2P) connection method based on a time duration for which a mobile terminal is positioned within a reference region with respect to an object, according to an example embodiment of the present invention. According to an example embodiment of the present invention, an NFC-enabled object may be another mobile terminal.

If a recognized NFC-enabled object is another mobile terminal, the controller 180 may share data such as phone numbers and photos, with the recognized mobile terminal through a P2P function. In this case, the controller 180 may select a communication method with the object 1000 or mobile terminal, based on a time duration for which the terminal body is positioned within the reference region. Here, the communication method with the object 1000 is a radio communication method by which the mobile terminal 100 transmits or receives data to/from the object 1000, which may include at least one of Wireless-Fidelity (Wi-Fi), Digital Living Network Alliance (DLNA), Near Field Communication (NFC), BlueTooth (BT) and Wi-Fi Direct.

Referring to FIG. 8A, if the mobile terminal 100 is positioned near the object 1000, i.e., if the mobile terminal 100 enters a reference region 300, the controller 180 recognizes the object 1000 using a near field radio communication method. And, the controller 180 counts a time duration for which the mobile terminal 100 is positioned within the reference region 300. Matching information between the counted time and a radio communication method is stored in the memory 160. The matching information may indicate different types of radio communication methods corresponding to different types of reference times. Alternatively, a user may directly match time information with radio communication methods, and then may store the matching information in the memory 160.

As shown in FIGS. 8A(b) to (e), the controller 180 may select different types of radio communication methods at reference time intervals according to lapse of a time duration for which the mobile terminal 100 is positioned within the reference region 300. In order to provide information on selectable radio communication methods to a user, the controller 180 may output, via the display unit 151, at least one of graphic objects 201, 202 and 203 corresponding to the different radio communication methods.

The controller 180 may generate a control signal for selecting one of the plurality of graphic objects 201, 202 and 203, based on a time duration for which the mobile terminal 100 is positioned within the reference region 300. The controller 180 controls the wireless communication unit 110 to perform data communication with the object 1000, by using a radio communication method corresponding to a graphic object selected when the mobile terminal 100 moves out of the reference region 300.

The graphic objects 201, 202 and 203 may be sequentially selected according to the order arranged on the display unit 151, based on time durations for which the mobile terminal 100 is positioned within the reference region 300. For example, each of the graphic objects 201, 202 and 203 may be highlighted one by one, as shown in FIG. 8A(b)-(d), such that a radio communication method corresponding to the highlighted graphic object can be selected when the mobile terminal 100 moves out of the reference region 300 while the highlighted graphic object is displayed.

As shown in FIG. 8A(b), if a time duration for which the mobile terminal 100 is positioned within the reference region 300 is 'M1' seconds, the controller 180 selects the graphic object 201 corresponding to 'Bluetooth' among the plurality of graphic objects 201, 202 and 203. Further, as shown in FIG. 8A(c), if a time duration for which the mobile terminal 100 is positioned within the reference region 300 is 'M2' seconds, the controller 180 selects the graphic object 202 corresponding to Wi-Fi Direct' among the plurality of graphic objects 201, 202 and 203. Therefore, the controller 180 may select one of a plurality of radio communication methods, based on a time duration for which the mobile terminal 100 is positioned within the reference region 300 and when the mobile terminal 100 moves out of the reference region 300.

As shown in FIGS. 8A(d) and (e), the controller 180 may control the wireless communication unit 110 to perform data communication with the object 1000, by using a radio communication method selected at a time point when the mobile terminal 100 moves out of the reference region 300, e.g., "Tethering." That is, upon recognizing that the mobile terminal 100 moves out of the reference region 300, the controller 180 determines a radio communication method with the object 1000, by acknowledging the recognition as a control command.

As shown in FIGS. 8A(b)-(d), the controller 180 may display a graphic object corresponding to a radio communication method selected based on a time duration for which the mobile terminal 100 is positioned within the reference region 300, in a different manner from other graphic objects. The graphic object corresponding to the selected radio communication method may be displayed differently from the other graphic objects, by at least one of enlargement, contraction, color change, flickering, or transparency change.

As shown in FIG. 8A(b), the controller 180 highlights the graphic object 201 corresponding to the 'Bluetooth' before a first reference time (M1) lapses. However, if the first reference time (M1) has lapsed as shown in FIG. 8A(c), the controller 180 highlights the graphic object 201 corresponding to the 'Wi-Fi Direct'. As shown in FIG. 8A(d), if a second reference time (M2) has lapsed, the controller 180 may highlight the graphic object 203 corresponding to the 'Tethering'. If a graphic object corresponding to a radio communication method to be used is highlighted, the mobile terminal 100 may communicate with the object 1000 when the mobile terminal 100 moves out of the reference region 300 while the graphic object is highlighted.

As aforementioned, the mobile terminal 100 may generate a control signal for selecting one of the communication methods, based on the fact that time durations for which the mobile terminal 100 is positioned within the reference region 300 are different from each other. Furthermore, the mobile terminal 100 highlights a graphic object corresponding to a communication method among the plurality of communication methods without receiving any direct user input. Thus, the mobile terminal 100 allows a user to select a desired communication method among the plurality of communication methods merely by moving the mobile terminal 100 out of the reference region 300 without entering any input via an physical input unit.

As shown in FIGS. 8A(b)-(d), the controller 180 may output guide information 210 in a visual, audible, or visible/audible manner, so as to inform a user that the mobile terminal 100 should move out of the reference region 300 with respect to the object 1000 for communication with the object 1000 by one of the plurality of radio communication methods. In particular, the display unit 151 may display a notification message "Move mobile terminal out of reference region in desired mode."

As shown in FIG. 8A, the controller 180 counts a time duration for which the mobile terminal 100 is positioned within the reference region 300, so as to select one of a plurality of radio communication methods. In one example embodiment, the controller 180 outputs an indicator for a counted time duration via the display unit 151, as shown in FIG. 8B. Accordingly, the user may recognize that a first or second reference time is being counted, and may determine a time duration for which the mobile terminal 100 should be positioned within the reference region 300, in order to select a desired radio communication method.

For example, counted time information may be displayed by a progress bar 220, an image object, text, or combination thereof. Alternatively, the counted time information may be displayed by various images (e.g., hourglass, clock, etc.) or text. In other words, the controller 180 may display a time duration for which the mobile terminal 100 is positioned within the reference region 300, and a preset reference time, in various manners so that the user can recognize the time information.

As shown in FIG. 8C, the controller 180 may select data to be transmitted to the object 1000 based on a time duration for which the mobile terminal 100 is positioned within the reference region 300. Then, the controller 180 may transmit, to the object 1000, data selected at a time point when the mobile terminal 100 moves out of the reference region 300.

For instance, as shown in FIGS. 8C(a) and (b), the number of selected data may change according to a time duration for which the mobile terminal 100 is positioned within the reference region 300. During the process of selecting at least one file to be transmitted from the mobile terminal 100 to the object 100, files are selected automatically while the mobile terminal 100 is within the reference region 300 and the number of the selected files may increase or decrease as the time lapses. For example, in FIG. 8C(a), four image data are selected and when the time lapses, one additional image data is selected, as shown in FIG. 8C(b). When five image data have been selected as shown in FIG. 8C(b), if the terminal body 100 moves out of the reference region 300, as shown in FIG. 8C(c), the controller 180 transmits the five selected image data to the object 1000. At this time, the controller 180 may also output notification 800 indicating that five image data were selected and will be transmitted, as shown in FIG. 8C(c).

As aforementioned, in the mobile terminal 100 according to an example embodiment of the present invention, data to be transmitted to the object 1000 is selected based on a time duration for which the mobile terminal 100 is positioned within the reference region 300. Therefore, a user does not need to apply an additional control command for selecting data to be transmitted. That is, no input needs to be received by the mobile terminal 100 via the external input unit 130 to select data since the desired data may be selected simply by keeping the mobile terminal 100 within the reference region 300 or moving the mobile terminal 100 out of the reference region 300.

Hereinafter, a method for selecting and setting a radio communication method based on a time duration for which the terminal body is positioned within the reference region, will be explained in more details with reference to the attached drawings. FIGS. 9A to 9D are diagrams for explaining a method for selecting setting information based on a time duration for which a mobile terminal is positioned within a reference region with respect to an object, according to an example embodiment of the present invention.

Information on a location can be stored in the aforementioned object such as a tag or a sticker or a card, each having therein a micro chip. In this case, the wireless communication unit 110 may receive location information included in the object 1000 when the mobile terminal 100 approaches to the object 1000. Upon receipt of the location information stored in the object 1000, the controller 180 recognizes that the mobile terminal 100 is positioned in a specific location, and may change setting information based on the specific location. The setting information includes information associated with setting of the mobile terminal 100, such as a call receiving method, an instant message receiving method, whether to set GPS, whether to set Wi-Fi, a lighting brightness, a bell sound, or a character size.

The setting information may be implemented in a plurality of modes through different combinations. Information on the plurality of modes may be pre-stored in the memory 160 or the object 1000.

Referring to FIG. 9A(a), as a user of the mobile terminal 100 approaches a car or gets in the car, the controller 180 will recognize the object 1000 installed in the car. Once the object 1000 is recognized, a menu for changing setting information of the mobile terminal 100 may be displayed as shown in FIG. 9A(b). The menu will suggest a plurality of modes and allow the user to select one of the plurality of modes. For example, the controller 180 may select one of the plurality of modes having different setting information, based on a time duration for which the mobile terminal 100 is positioned within a reference region where NFC can be performed with the object 1000 and highlight the selected one of the plurality of modes. Then, if the mobile terminal 100 moves away from the object 1000 such that the mobile terminal 100 moves out of the reference region 300, the controller 180 change setting information of the mobile terminal 100 into the highlighted mode selected from the plurality of modes.

As shown in FIG. 9A(b), if the time duration for which the mobile terminal 100 is positioned within the reference region 300 is 'M1' seconds, the controller 180 selects a graphic object 201 MODE A') among the plurality of graphic objects 910, 920 and 930 corresponding to the plurality of setting modes. If the time duration for which the mobile terminal 100 is positioned within the reference region 300 is 'M2' seconds, the controller 180 selects the graphic object 920 ('MODE B') among the plurality of graphic objects 910, 920 and 930. Therefore, the controller 180 may select one of the plurality of setting modes based on a time duration for which the mobile terminal 100 is positioned within the reference region 300.

The controller 180 may also provide information on a selected mode by outputting detailed setting information 910A or 920A about the selected mode via the display unit 151, as shown in FIGS. 9A(b) and (c). As shown in FIGS. 9A(c) and (d), the controller 180 may change setting information of the mobile terminal 100 to a setting mode ('MODE B') selected from the plurality of setting modes at a time point when the mobile terminal 100 moves out of the reference region 300 while the graphic object 920 is highlighted. More specifically, upon recognizing that the mobile terminal 100 moves out of the reference region 300, the controller 180 may change the setting information of the mobile terminal 100 by using the recognition as a control command.

As shown in FIGS. 9A(b) and (c), the controller 180 may display a graphic object corresponding to a setting mode selected based on a time duration for which the mobile terminal 100 is positioned within the reference region 300, in a different manner from other graphic objects. The graphic object corresponding to the selected setting mode may be differently displayed from the other graphic objects, by at least one of enlargement, contraction, color change, flickering, or transparency change. Displaying a specific graphic object in a different manner from the other graphic objects may be called 'highlighting'.

The controller 180 may determine a setting mode to be selected according to lapse of a time duration for which the mobile terminal 100 is positioned within the reference region 300. Then, the controller 180 may change the highlighted graphic object such that a graphic object corresponding to a re-determined (reselected) setting mode among the plurality of graphic objects 910, 920 and 930 can be differentiated from the other graphic objects.

As shown in FIG. 9A(b), the controller 180 highlights the graphic object 910, 'MODE A' before a first reference time (M1) lapses. However, if the first reference time (M1) has lapsed as shown in FIG. 9A(c), the controller 180 highlights the graphic object 920, 'MODE B'.

If a graphic object corresponding to a setting mode desired by a user is highlighted and the user moves the mobile terminal 100 out of the reference region 300, the controller 180 changes the setting of the mobile terminal 100 into the desired setting mode. As shown in FIGS. 9A(b) and (c), the controller 180 may also output guide information 901 in a visual, audible, or audiovisual manner, so as to inform a user that the mobile terminal 100 should move out of the reference region 300 with respect to the object 1000, for setting of the mobile terminal 100 to one of the plurality of setting modes. Further, as shown in FIG. 9A(d), the controller 180 may output notification 902 indicating that the setting has been changed to MODE B when the MODE B has been selected.

Figure 9B:
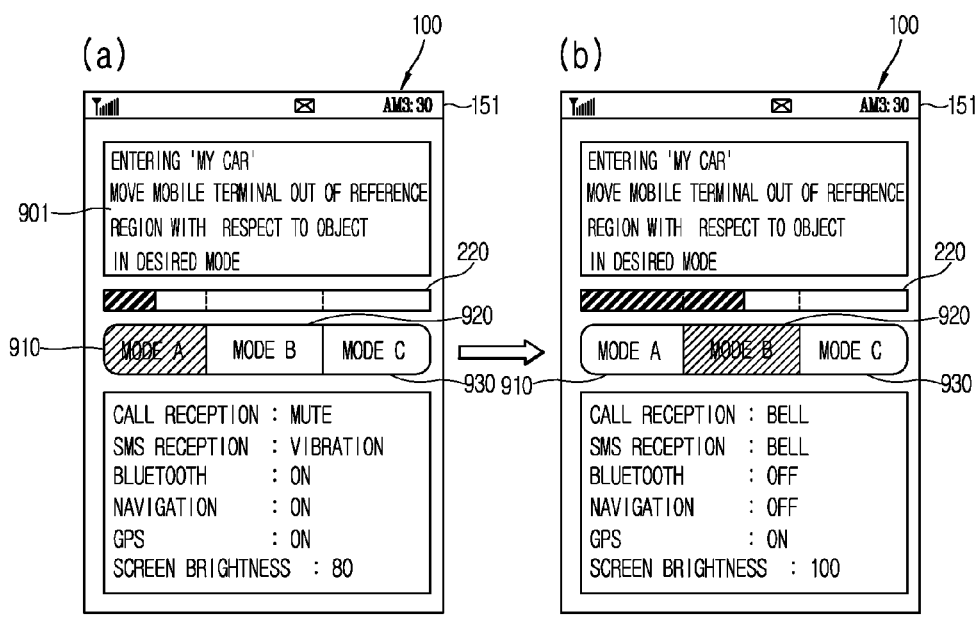

As shown in FIG. 9A, the controller 180 counts a time duration for which the mobile terminal 100 is positioned within the reference region 300, so as to select one of the plurality of setting modes. Further, as shown in FIG. 9B, the controller 180 may also output an indicator 220 for a counted time duration via the display unit 151.

Accordingly, the user may recognize that a first or second reference time is being counted and determine a time duration for which the mobile terminal 100 should be positioned within the reference region 300 in order to select a desired setting mode.

The indicator 220 may be displayed as a progress bar, as shown in FIG. 9B, or an image object, text, or combination thereof. Alternatively, the counted time information may be displayed by various images (e.g., hourglass, clock, etc.) or text.

Figure 9C:
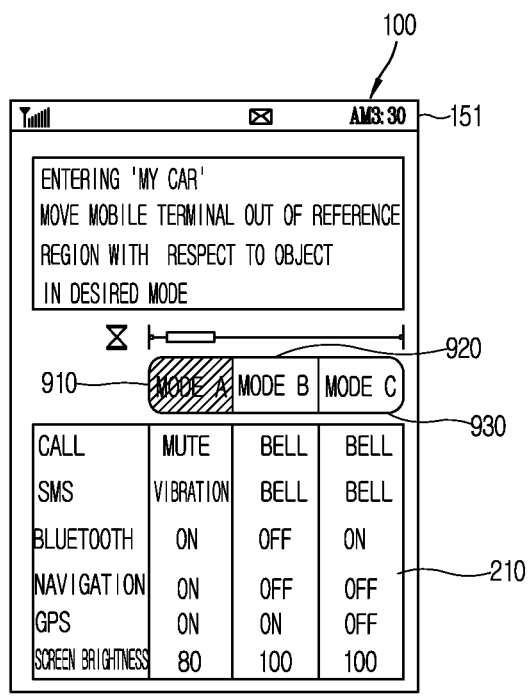

The display unit 151 may display a time duration for which the mobile terminal 100 is positioned within the reference region 300 and a preset reference time in various manners such that the user can recognize the time information. In an embodiment, as shown in FIG. 9C, the controller 180 may output setting information 210 about each of the plurality of modes together via the display unit 151 so that the user can compare the setting information for each mode.

Figure 9D:
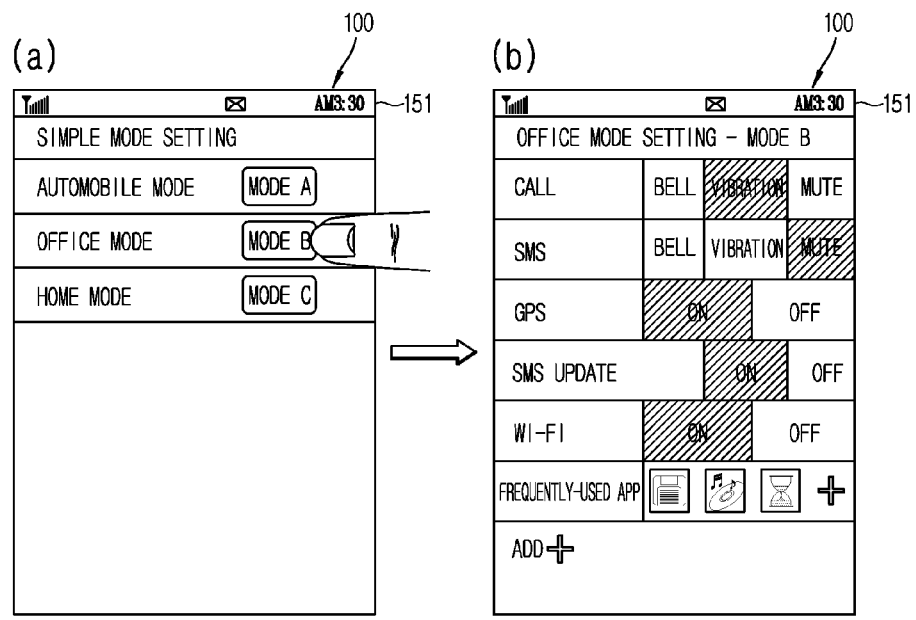

As shown in FIGS. 9D(a) and (b), in the mobile terminal according to an example embodiment of the present invention, setting information corresponding to a specific location can be directly set by a user. For instance, alternative to the method of selecting a specific mode as described referring to FIGS. 9A-9C, the user may manually select a desired mode, for example, "MODE B" from a menu for mode setting. A user can select setting information for each settable category (e.g., call, SMS, GPS, etc.), and can add other categories as necessary.

The specific location may be a location based on a user's selection, such as an automobile, an office and home. Information about the specific location may be received from the object 1000 as aforementioned.

The aforementioned method may be implemented as a program code stored in a computer-readable storage medium. The storage medium may include ROM, RAM, CD-ROM, a magnetic tape, a floppy disc, an optical data storage device, etc. And, the storage medium may be implemented as carrier wave (transmission through the Internet).

The foregoing embodiments and advantages are merely exemplary and are not to be considered as limiting the present disclosure. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be considered broadly within its scope as defined in the appended claims, and therefore all changes and modifications that fall within the metes and bounds of the claims, or equivalents of such metes and bounds are therefore intended to be embraced by the appended claims.

What is claimed is:

1. A mobile terminal, comprising:
   a communication unit configured to:
      perform near field communication (NFC) with a detected object; and
      receive data from the object;
   a display; and
   a controller configured to:
      monitor time duration for which the terminal remains within a first threshold distance relative to the object;
      identify each of a plurality of time thresholds respectively occurring during the time duration; and
      cause the display to sequentially display a plurality of different data responsive to an occurrence of a corresponding time threshold of the plurality of time thresholds,
   wherein:
      each of the plurality of different data corresponds to one of the plurality of time thresholds; and
      the plurality of different data is based on the data received from the object.

2. The mobile terminal of claim 1, wherein the controller is further configured to:
   start monitoring the time duration when the terminal is positioned within a reference region with respect to the object, the first threshold distance substantially being a distance between a boundary of the reference region and the object;
   cause the display to sequentially display the plurality of different data in order until last data is output while the terminal remains within the reference region; and
   end monitoring the time duration when the terminal moves out of the reference region.

3. The mobile terminal of claim 2, further comprising an output unit configured to output various signals,
   wherein the controller is further configured to at least:
      output a first signal via the output unit when the terminal is within a second threshold distance relative to the first threshold distance;
      output a second signal via the output unit when the terminal moves out of the reference region; or
      output a third signal via the output unit while the terminal is positioned within the reference region.

4. The mobile terminal of claim 2, wherein the controller is further configured to:
   determine that the terminal is not positioned within the reference region;
   stop outputting data that is to follow currently displayed data when it is determined that the terminal is not positioned within the reference region; and
   execute a function associated with the currently displayed data when the terminal moves out of the reference region.

5. The mobile terminal of claim 4, wherein the controller is further configured to output guide information while the terminal is positioned within the reference region, the guide information instructing to move the terminal out of the reference region if the function associated with the currently displayed data is desired to be executed.

6. The mobile terminal of claim 5, wherein:
   the guide information comprises a first notification displayed at a region of the display; and
   the controller is further configured to cause the display to display a second notification at a region of the display when the terminal has moved out of the reference region, the second notification indicating that the function associated with the currently displayed data is to be executed.

7. The mobile terminal of claim 2, wherein:
   the terminal is capable of establishing a peer to peer (P2P) network with the object; and
   the controller is further configured to:
      cause the display to display a plurality of communication methods available for establishing the P2P network while the terminal is positioned within the reference region;
      cause the display to display a first method among the plurality of communication methods in a different style relative to the rest of the displayed plurality of communication methods while the terminal is positioned within the reference region;
      cause the display to display a second method among the plurality of communication methods in a different style after a preset period of time while the first method is displayed in the same style as the rest of the displayed plurality of communication methods and the terminal is positioned within the reference region;
      detect the terminal moving out of the reference region while the second method is displayed in the different style; and
      select the second method to establish the P2P network with the object when it is determined that the terminal has moved out of the reference region while the second method was displayed in the different style.

8. The mobile terminal of claim 1, wherein the controller is further configured to cause the display to display an indicator indicating remaining time for a current time threshold.

9. The mobile terminal of claim 1, further comprising a user input unit configured to receive input from a user, the user input unit comprising at least a touchscreen, a keypad or a button,
wherein:
the received data include one or more NFC Data Exchange Format (NDEF) records; and
the controller is further configured to:
output, via the display, first screen information corresponding to a first NDEF record, among the received one or more NDEF records, during a first time threshold without receiving any further user input via the user input unit; and
output, via the display, second screen information corresponding to a second NDEF record, among the received one or more NDEF records, during a second time threshold, which follows the first time threshold when the first time threshold expires, without receiving any further user input via the user input unit.

10. The mobile terminal of claim 9, wherein the controller is further configured to:
cause the display to display one or more thumbnail images including information corresponding to the one or more NDEF records at a region of the display while displaying the first screen information, the one or more thumbnail images including a first thumbnail image including information corresponding to the second NDEF record; and
cause the display to display the second screen information before the first time threshold expires in response to an input for selecting the first thumbnail image received during the first time threshold.

11. The mobile terminal of claim 1, wherein the controller is further configured to:
prompt to change a setting of the terminal upon recognizing a location-specific object; and
change the setting when:
the terminal is positioned within a preset boundary with respect to the location-specific object at least for a preset period of time after the prompting; or
the terminal moves out of the preset boundary after the prompting.

12. A method for controlling a mobile terminal, the method comprising:
detecting an object configured to perform near field communication (NFC) with the terminal;
receiving data from the detected object;
monitoring time duration for which the terminal remains within a first threshold distance relative to the object;
identifying each of a plurality of time thresholds respectively occurring during the time duration; and
sequentially displaying a plurality of different data responsive to an occurrence of a corresponding time threshold of the plurality of time thresholds,
wherein:
each of the plurality of different data corresponds to one of the plurality of time thresholds; and
the plurality of different data is based on the data received from the object.

13. The method of claim 12, further comprising:
starting monitoring the time duration when the terminal is positioned within a reference region with respect to the object, the first threshold distance substantially being a distance between a boundary of the reference region and the object;
sequentially displaying the plurality of different data in order until last data is output while the terminal remains within the reference region; and
ending monitoring the time duration when the terminal moves out of the reference region.

14. The method of claim 13, further comprising at least:
outputting a first signal via an output unit of the terminal when the terminal is within a second threshold distance relative to the first threshold distance;
outputting a second signal via the output unit when the terminal moves out of the reference region; or
outputting a third signal via the output unit while the terminal is positioned within the reference region.

15. The method of claim 13, further comprising:
determining that the terminal is not positioned within the reference region;
stopping outputting data that is to follow currently displayed data when it is determined that the terminal is not positioned within the reference region; and
to executing a function associated with the currently displayed data when the terminal moves out of the reference region.

16. The method of claim 15, further comprising outputting guide information while the terminal is positioned within the reference region, the guide information is instructing to move the terminal out of the reference region if the function associated with the currently displayed data is desired to be executed.

17. The method of claim 16, wherein:
the guide information comprises a first notification displayed at a region of the display; and
the method further comprises displaying a second notification at a region of the display when the terminal has moved out of the reference region, the second notification indicating that the function associated with the currently displayed data is to be executed.

18. The method of claim 13, wherein:
the received data include one or more NFC Data Exchange Format (NDEF) records; and
the method further comprises:
outputting first screen information corresponding to a first NDEF record, among the received one or more NDEF records, during a first time threshold without receiving any further user input via a user input unit of the terminal while the terminal is within the reference region; and
outputting second screen information corresponding to a second NDEF record, among the received one or more NDEF records, during a second time threshold, which follows the first time threshold when the first time threshold expires, without receiving any further user input via the user input unit.

19. The method of claim 18, further comprising:
is outputting one or more thumbnail images including information corresponding to the one or more NDEF records at a region of the display while displaying the first screen information, the one or more thumbnail images including a first thumbnail image including information corresponding to the second NDEF record; and
displaying the second screen information before the first time threshold expires in response to an input for selecting the first thumbnail image received during the first time threshold.

20. The method of claim 12, further comprising displaying an indicator indicating remaining time for a current time threshold.

21. The method of claim 13, wherein:

the object comprises a device which is capable of establishing a peer-to-peer (P2P) network with the terminal; and the method further comprises:

displaying a plurality of communication methods available for establishing the P2P network while the terminal is positioned within the reference region;

displaying a first method among the plurality of communication methods in a different style relative to the rest of the displayed plurality of communication methods while the terminal is positioned within the reference region;

displaying a second method among the plurality of communication methods in a different style after a preset period of time while the first method is displayed in the same style as the rest of the displayed plurality of communication methods and the terminal is positioned within the reference region;

detecting the terminal moving out of the reference region while the second method is displayed in the different style; and selecting the second method to establish the P2P network with the object when it is determined that the terminal has moved out of the reference region while the second method was displayed in the different style.

22. The method of claim 13, further comprising:

selecting data to be transmitted to the object, a number of the selected data increasing as the terminal remains within the reference region longer; and stopping selecting the data and transmitting the selected data to the object by performing the NFC with the object when the terminal has moved out of the reference region.

* * * * *